United States Patent
Gonzales et al.

(10) Patent No.: US 7,099,723 B2
(45) Date of Patent: *Aug. 29, 2006

(54) PROVIDING DISTRIBUTED SCENE PROGRAMMING OF A HOME AUTOMATION AND CONTROL SYSTEM

(75) Inventors: Greg Gonzales, Las Cruces, NM (US); Brian D Baker, Tucson, AZ (US); Sara White, Las Cruces, NM (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/232,587

(22) Filed: Sep. 22, 2005

(65) Prior Publication Data

US 2006/0020353 A1 Jan. 26, 2006

Related U.S. Application Data

(63) Continuation of application No. 10/977,151, filed on Oct. 29, 2004, now Pat. No. 6,970,751, which is a continuation of application No. 10/154,403, filed on May 22, 2002, now Pat. No. 6,823,223, which is a continuation-in-part of application No. 09/955,570, filed on Sep. 17, 2001, now abandoned, which is a continuation of application No. 09/751,383, filed on Dec. 29, 2000, now abandoned.

(60) Provisional application No. 60/173,741, filed on Dec. 30, 1999.

(51) Int. Cl.
*G05B 19/42* (2006.01)
*G05B 15/00* (2006.01)
*G05B 15/02* (2006.01)
*G05B 19/18* (2006.01)
*G05B 11/01* (2006.01)
*G05B 23/02* (2006.01)

(52) U.S. Cl. ............... 700/87; 700/9; 700/17; 700/19; 700/20; 700/75; 700/83; 340/3.3

(58) Field of Classification Search ............ 700/9, 700/11, 17, 19, 20, 75, 76, 83, 86, 87, 264, 700/275, 276; 340/3.1, 3.3, 3.9
See application file for complete search history.

(56) References Cited

U.S. PATENT DOCUMENTS

| | | |
|---|---|---|
| 5,187,655 A | 2/1993 | Post et al. |
| 5,526,358 A | 6/1996 | Gregerson et al. |
| 5,530,322 A | 6/1996 | Ference et al. |
| 5,621,662 A | 4/1997 | Humphries et al. |
| 5,677,603 A | 10/1997 | Speirs et al. |
| 5,699,351 A | 12/1997 | Gregerson et al. |
| 5,706,191 A | 1/1998 | Bassett et al. |
| 5,793,968 A | 8/1998 | Gregerson et al. |
| 5,841,360 A | 11/1998 | Binder |
| 5,877,957 A | 3/1999 | Bennett |
| 5,920,476 A | 7/1999 | Hennessey et al. |
| 5,959,536 A | 9/1999 | Chambers et al. |
| 6,192,282 B1 | 2/2001 | Smith et al. |
| 6,240,325 B1* | 5/2001 | Brundisini ............... 700/19 |
| 6,285,912 B1 | 9/2001 | Ellison et al. |
| 6,466,234 B1 | 10/2002 | Pyle et al. |
| 6,545,434 B1 | 4/2003 | Sembhi et al. |
| 6,581,846 B1* | 6/2003 | Rosen .............. 236/46 R |
| 6,597,374 B1* | 7/2003 | Baker et al. ........... 715/717 |
| 6,618,772 B1* | 9/2003 | Kao et al. ............... 710/15 |
| 6,640,141 B1 | 10/2003 | Bennett |
| 6,761,470 B1* | 7/2004 | Sid ...................... 362/233 |
| 6,813,525 B1* | 11/2004 | Reid et al. ............. 700/19 |
| 6,888,472 B1* | 5/2005 | Yoshimura et al. .... 340/825.22 |
| 7,010,369 B1* | 3/2006 | Borders et al. .......... 700/90 |
| 7,020,289 B1* | 3/2006 | Riggs ................... 381/86 |
| 7,027,878 B1* | 4/2006 | Bennett ................ 700/14 |
| 2002/0014972 A1 | 2/2002 | Danielson et al. |
| 2002/0128729 A1* | 9/2002 | Blair et al. ............ 700/19 |
| 2004/0138768 A1* | 7/2004 | Murray et al. .......... 700/90 |

OTHER PUBLICATIONS

CEBus: "CAL Context Description," EIA-600.82, Electronics Industries Association, Feb. 2, 1996, pp. 1-15.
CEBus: "Common Application Language (CAL) Specification," EIA-600.81, Electronics Industries Association, Sep. 17, 1996.

CEBus Industry Council (CIC), *HomePnP™ Specification Version 1.0, Home Plug & Play™: CAL-Based Interoperability for Home Systems*, Indianapolis, Ind., Apr. 9, 1998, pp. 1-111.

CEBus: "PL Physical Layer & Medium Specification," EIA-600.31, Electronics Industries Association, Aug. 30, 1995, pp. 1-25.

CEBus: "RF Physical Layer & Medium Specification," EIA-600.35, Electronics Industries Association, Aug. 30, 1995, pp. 1-17.

Evans, Grayson, "CEBus: Defining the Future of Residential Communications," *Australian Electronics Engineering* 30(3):34-36, 38, Mar. 1997.

"Introduction to the CEBus Standard," EIA-600.10, Electronics Industries Association, Feb. 5, 1995, pp. 1-17.

Lawrenz, Wolfhard, "eBUS—Der Bus für die Heizungstechnik," *Elektronik* 47(2):60, 62, 64-66, Jan. 20, 1998.

Markwater, Brian, and Larry Stickler, "Design Techniques for Plug-and-Play in 'Smart Homes' and Consumer Products," *Electronic Design* 45(17):64-66, 68, Aug. 18, 1997.

Tsang, Peter W. M., and Raymond W. C. Wang, "Development of a Distributive Lighting Control System Using Local Operating Network," *IEEE Transactions on Consumer Electronics* 40(4):879-889, Nov. 1, 1994.

Wright, Maury, "Home-Automation Networks Mature While the PC Industry Chases a New Home LAN," *EDN*, Jun. 4, 1998, pp. 101-102, 104, 106, 108, 110, 112-114.

\* cited by examiner

*Primary Examiner*—Crystal J. Barnes

(74) *Attorney, Agent, or Firm*—Christensen O'Connor Johnson Kindness PLLC

(57) ABSTRACT

A method and apparatus for providing a simple user interface for programming scenes and multi-way groups in a home automation and control system is provided. Each device participating in the home automation and control system is equipped with control logic for providing the simple programming interface. Through the control logic, each device maintains its status in a system-wide programming mode and retains knowledge of its inclusion or exclusion in the current scene or multi-way group being programmed. When any device in the system receives indications that affect the system programming mode, such as a press on one of the buttons on the devices, the device broadcasts a notification message to all devices within the home automation and control system. The message maintains the integrity of the system programming mode. Each device knows when a scene or multi-way group being programmed is finally captured and the programming of a new scene or multi-way group has started.

15 Claims, 19 Drawing Sheets

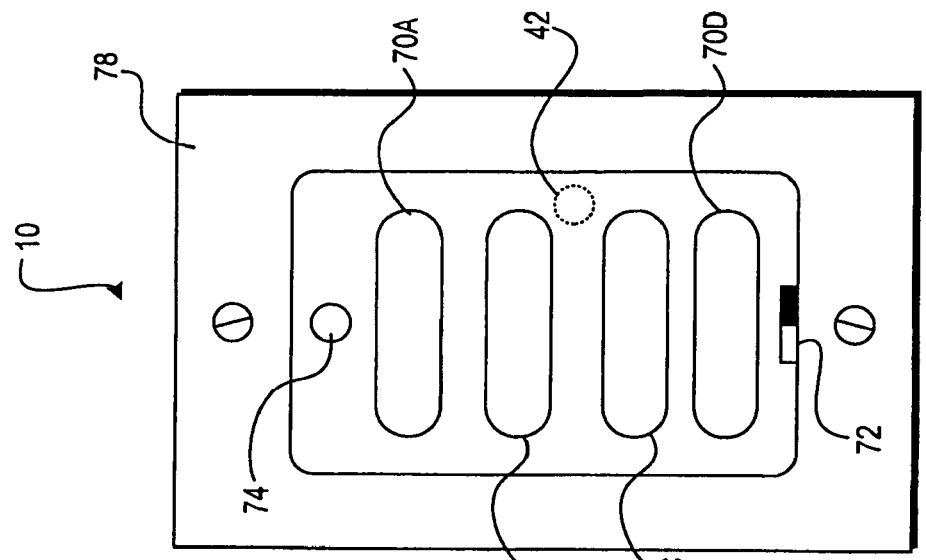
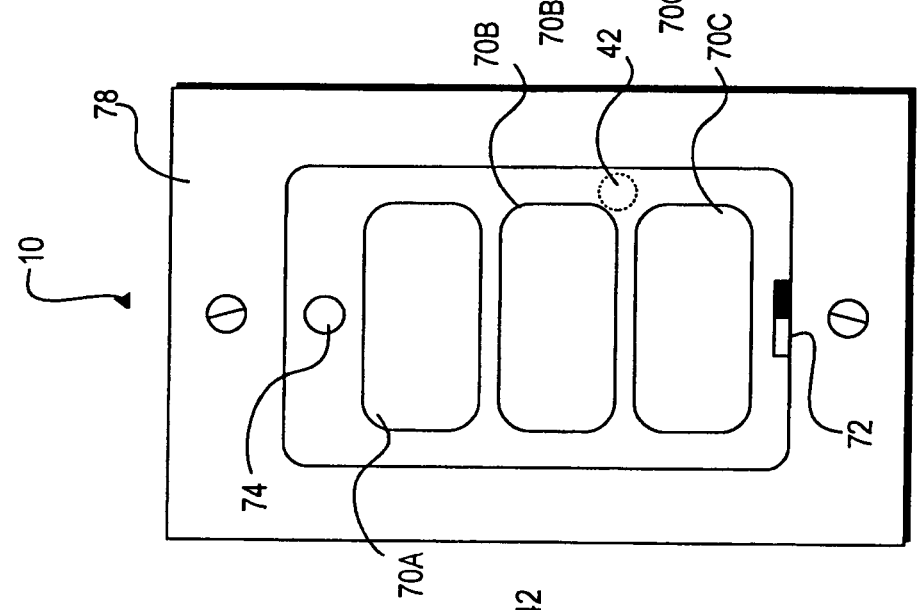
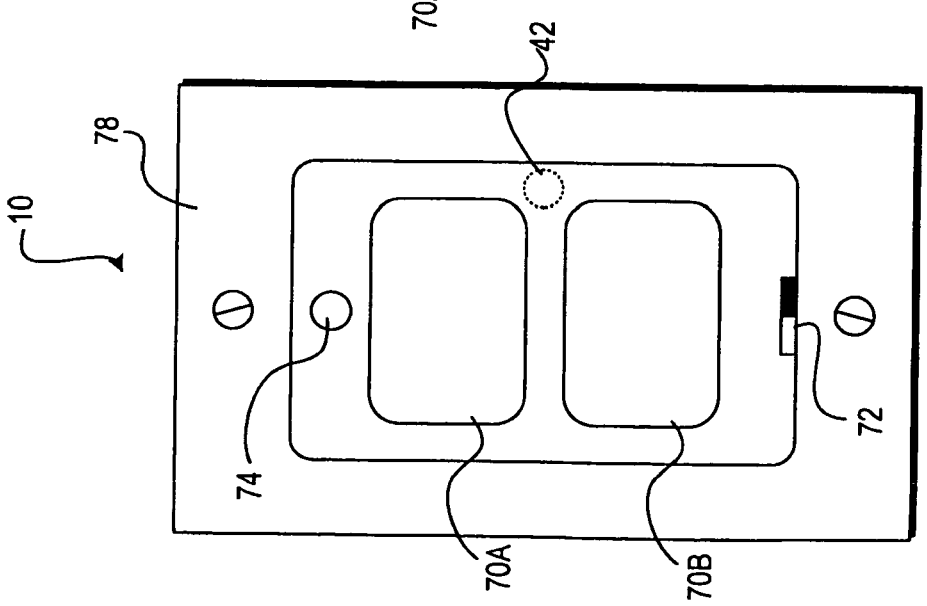

PROVIDING DISTRIBUTED SCENE PROGRAMMING OF A HOME AUTOMATION AND CONTROL SYSTEM

CROSS-REFERENCES TO RELATED APPLICATIONS

This application is a continuation of U.S. patent application Ser. No. 10/977,151, filed Oct. 29, 2004 now U.S. Pat. No. 6,970,751, which is a continuation of U.S. patent application Ser. No. 10/154,403, filed May 22, 2002 now U.S. Pat. No. 6,823,223, which is a continuation-in-part of U.S. patent application Ser. No. 09/955,570, filed Sep. 17, 2001, now abandoned, which is a continuation of U.S. patent application Ser. No. 09/751,383, filed Dec. 29, 2000, now abandoned, which claims the benefit of prior U.S. Provisional Patent Application No. 60/173,741, filed Dec. 30, 1999, each of which applications is expressly incorporated herein by reference.

TECHNICAL FIELD

The present invention relates to the field of home automation and control systems and, more particularly, to a method and apparatus for providing distributed programming of a home automation and control system.

BACKGROUND

Home automation and control systems are used to control the behavior of an environment such as a home or office building. Home automation and control systems allow home occupants to automate and control the use of electrical products and appliances in and around the building. Home automation and control systems create and launch "scenes," also called house scenes, involving one or more products and appliances. Examples of the types of products and appliances that can be automated and controlled are lighting, entertainment, cooking, heating, air conditioning, window treatments and landscaping. Examples of specific products and appliances that can be automated and controlled are lights, television sets, sound systems, coffee machines, ovens, furnaces, air conditioners, humidifiers and lawn sprinklers. Each product or appliance can be set to a number of different states, i.e., on, off, and, if appropriate, intermediate level. The controller of an electrical product or appliance, together with its effect on the controlled electrical product or appliance, will be referred to as a "device." The controller may be a physically separate entity from the product or appliance being controlled, or the controller may be physically embedded or integrated into the product or appliance being controlled.

A "scene" includes one (1) or more devices set to a particular state. For example, a morning scene could include the furnace set to 70°, the master bathroom lights on at 50%, the kitchen lights on at 100%, the coffee machine on, the television set in the kitchen on to a particular channel, and the front porch light off. This setting of devices constitutes one scene, and may be triggered by a trigger event also defined by the user, such as the press of a button on a remote control. A different scene may set additional devices and some or all of the members of the one scene to the same or different states.

Scenes may include devices that can be set to level values, such as light dimmers, fan speeds, audio volume controls and device channels. Scenes that include devices set at level values are often difficult to create because each additional scene member changes the total effect, and changing a level of one device may make a previously set level in other scene device now undesirable. For example, the main lighting in a room could be set to the desired total illumination. But the local illumination by the user's reading chair may not be bright enough, so the chair lighting is increased, which may make the room total light too bright, and reducing the other room lights to get the desired total illumination may cause the local illumination by the reading chair light to become too low again. Getting the exact value desired for scene devices may take a lot of trial and error adjustment to the level values until the final device values give the desired total scene effect. Current home automation and control systems create scenes with complex, interacting level values using several methods, each of which has significant drawbacks.

One method is to program the entire scene so that the scene is correct the first time. The human programmer must then go experience the scene to determine if the desired scene effect is right. If the scene effect is wrong, the whole scene must be reprogrammed. This can be a time-consuming process for scenes with many device levels to be set at different values.

Another method is to use a central controller or centralized programmer to set the value level of each scene device individually. The human programmer must then go experience the scene to determine if the desired scene effect is right. If the scene effect is wrong, each device level that is not correct must be reset by the central controller or centralized programmer. This can be a time-consuming process for scenes with many device levels to be set at different values.

A further method is to have the human programmer adjust the devices while experiencing the scene. When the human programmer is satisfied with the total scene effect, the central controller or centralized programmer queries the devices to acquire each scene member's level. This method is prone to error because the human programmer, who must indicate to the central controller or centralized programmer which devices are part of the scene, may forget to include a scene device that was manually adjusted to create the desired scene effect.

Therefore, in light of the above, there is a need for a home automation and control scene programming method that allows infinite scene member of manual adjustments before finalizing a scene, and that automatically keeps track of all scene members, thereby reducing time and scene programming error rate.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention provides a method and system for programming home automation and control system scenes that both allows unlimited scene member manual adjustments to be made before finalizing a scene, and that also automatically keeps track of all scene members, thereby reducing time and scene programming error rate. More specifically, this invention is directed to a simple programming interface, called SPI, that allows a user to create uniquely identified scenes by putting all devices in the whole system in a scene programming mode, which also starts a programming session. Each and every scene member is adjusted as many times as desired in any order. When all members have been adjusted to the final desired states, a trigger for the scene is selected, completing the programming session. At the end of a programming session, each device knows that if it has been adjusted since the start of the last system programming session and not subsequently removed as scene members, it is part of the scene being programmed with the device state value in the scene being their current device state value. Devices also know that if they have not been adjusted since the start of the last system programming session or have not been adjusted since they were last removed from the scene, they are not part of the scene being programmed in this programming session. The selection of the scene trigger initiates the creation of the scene, ends the current programming session, and starts a new programming session. While the SPI is most desirable in a system where the scene information is locally stored, SPI can be implemented in a way that sends the local state values to the selected triggering device, or to a centralized controller or programming entity for storage. As noted, the preferred use of the SPI is in systems that locally save house scenes information. An example of such a system is described in U.S. patent application Ser. No. 10/154,425, filed May 22, 2002, and titled "Method and Apparatus for Providing Distributed Control of a Home Automation and Control System," the subject matter of which is incorporated herein by reference. Local saving of house scene information enables truly distributed programming and distributed control of a home automation and control system.

According to an embodiment of the present invention, a microcontroller is embedded into each device within a home automation and control system along with logic for implementing the SPI. In this embodiment the SPI provides for programming scenes in distributed devices for local storage and, thus, implements distributed programming. According to this embodiment of the present invention, an indication is received by one device included in the home automation and control system that the system devices should be placed into a scene programming mode. In response to the indication, the devices are placed in a scene programming mode. Once the devices have been placed in the scene programming mode, devices may be added to the current scene being programmed in this session in response to receiving an indication that they should be included as members, such as an adjustment of a load control switch on the device. Once all desired member devices have been added to the house scene, and any accidentally added member devices have been removed as members, another indication assigns a scene launch command to the house scene. The launch scene command can be created by actuating a switch on one of the devices or an icon on a computer. Additional devices may be selected for launching the scene by copying the scene launch to each additional device. Additionally, new scenes based upon a previously created scene may be created, or an existing scene may be modified.

According to another embodiment of the present invention, the SPI is used to program a multi-way group that automatically keeps track of all multi-way members, thereby reducing the time required to program a multi-way group and the related error rate. Any control device included in a multi-way group of devices can directly and synchronously control all of the devices in that group. According to this embodiment of the present invention, an indication is received at one of the devices in the home automation and control system that the devices should be placed into a multi-way programming mode. In response to the indication, a message is broadcast to each device, thereby placing all devices in the multi-way programming mode and starting a multi-way programming session. Once the devices have been placed in the multi-way programming mode, devices may be added to the multi-way group being programmed in response to receiving an indication that they should be included, such as the press of a load control button on the device. Once the devices have been placed in the multi-way programming mode, devices may be removed from the multi-way being programmed in response to receiving an indication that they should be removed, such as the press of a load control button on an included device. Once all of the desired and only the desired group member devices have been added to the multi-way lighting context group, another indication is provided to capture the multi-way group and start a new multi-way programming session. The captured multi-way group is assigned a unique multi-way indicator. Each member of the multi-way group is then bound to that multi-way group in such a way that every member device in the multi-way group will be directly controlled by the load controller of any multi-way group member when the multi-way programming mode is exited. Additionally, a new multi-way group may be created based upon a previously created multi-way group.

The present invention also provides a computer-readable medium for providing distributed scene programming of a home automation and control system.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A–3C are block diagrams showing illustrative switch devices utilized in an actual embodiment of the present invention.

DETAILED DESCRIPTION

The present invention is directed to a simplified programming interface (SPI) for programming the devices of a home automation and control system. According to an embodiment of the present invention, each device includes control logic for providing an SPI for the device. When multiple devices are included in a home automation and control system, the SPI provides a consistent user interface across the system. Once a user of the home automation and control system understands how to program one scene, the user can easily program all other desired scenes in the system by following generally the same procedure.

Figure 1:
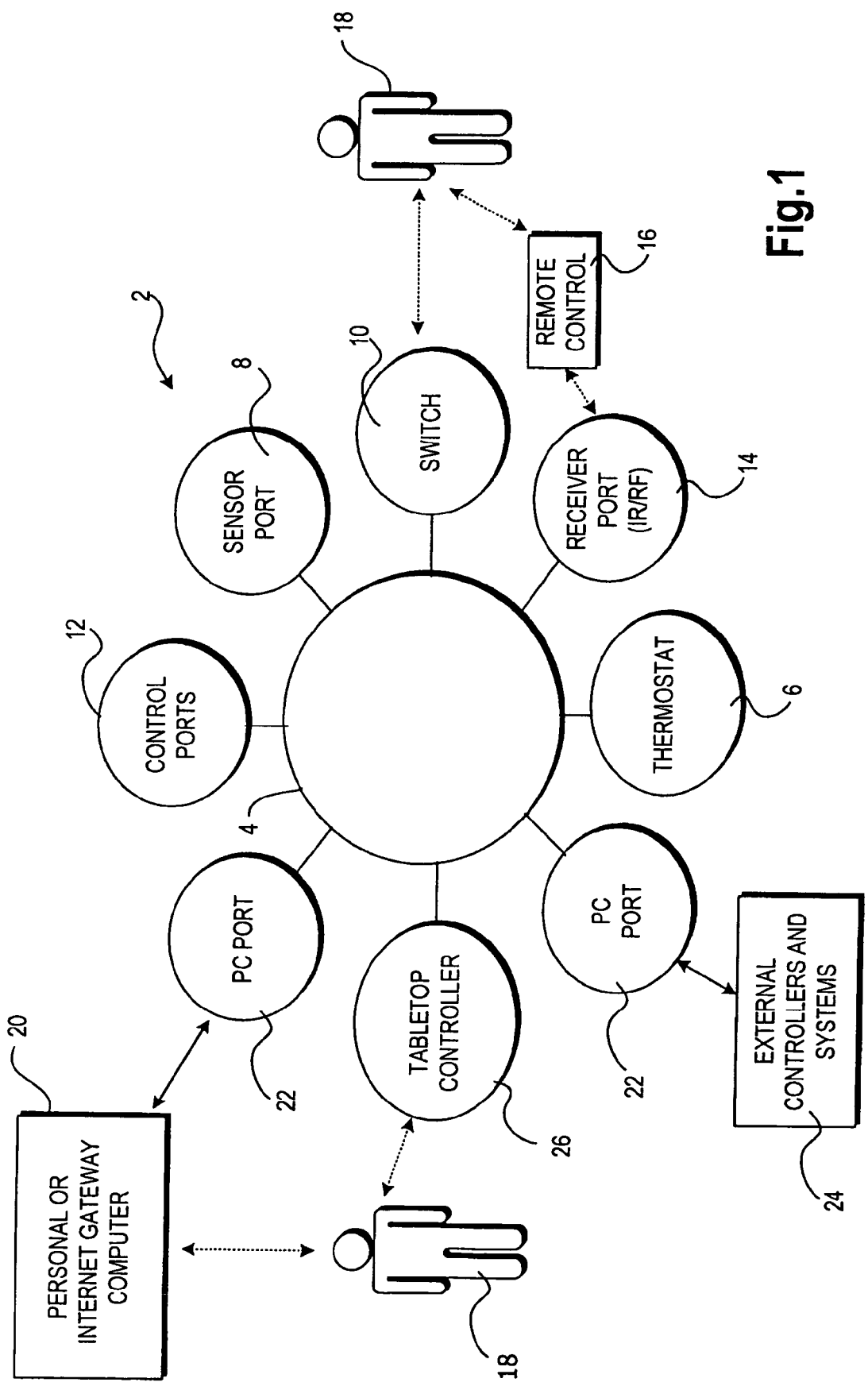
FIG. 1 is a block diagram showing an illustrative home automation and control system that provides an operating environment for an actual embodiment of the present invention.

Referring now to the figures, in which like numerals represent like elements, an actual embodiment of the present invention will be described. FIG. 1 provides an overview of an illustrative home automation and control system 2 in which aspects of the present invention may be practiced. It should be appreciated that the use of the term "home automation and control" includes, but is not limited to, home automation, home control, home networking, or connected home systems, which describe a home where products are not only connected or integrated with each other locally, but might also be connected across the Internet and via other networks. Moreover, although the home automation system 2 is described herein as being implemented in a home environment, those skilled in the art should appreciate that such systems may be similarly deployed in a business, factory, boat, or other premises where environmental automation is desired.

The home automation and control system 2 typically comprises a number of participating devices connected together by a common bus 4, or some other communication means. In the actual embodiment of the present invention described herein, the bus 4 comprises typical household powerline wiring. Those skilled in the art should appreciate, however, that other types of communications media may be utilized including twisted wire pair, coaxial cable, fiber optic cable, or other similar media. Additionally, wireless communications media, such as infrared ("IR") or radio frequency ("RF"), may also be utilized to provide inter-device communication.

The devices connected to the bus 4 and participating in the home automation and control system 2 may comprise a wide variety of devices for performing a wide variety of functions. For instance, such devices may include a thermostat device 6 for controlling temperature, a sensor port device 8 for detecting motion, light, sound, or other activity, a switch device 10 for triggering scenes or controlling an attached load, and a control port device 12 for controlling an attached load, such as a lamp, appliance or motor. Additionally, such devices may include a receiver port device 14 for triggering scenes based on IR or RF signals received from a wireless remote control 16 operated by a user 18. External controllers and systems 24 may also participate in the home automation and control system 2 through the use of a "PC Port" device 22 produced by C-SMART LLC of Las Cruces, N. Mex. The PC Port device 22 provides an interface between devices compatible with the home automation and control system 2, and devices from other manufacturers that are not natively compatible with the home automation and control system 2.

The user 18 may interact with the home automation and control system 2 through the devices. For instance, the user 18 may utilize the switch device 10 to control a load connected to a control port device 12 or to trigger a scene. The user 18 may also interact with the home automation and control system 2 through the use of a personal or Internet gateway computer 20. The personal or Internet gateway computer 20 is connected to the bus 4 and may participate in the home automation and control system 2 through the use of a PC Port device 22. The PC Port device 22 provides bi-directional communication support for the personal computer 20. In this manner, a user 18 can interact with the home automation and control system 2 through the computer 20, which is equipped with appropriate software, to interrogate devices, create or launch scenes, and perform other functions. The user 18 may also interact with the home automation and control system through the use of a tabletop controller 26 to launch scenes. User interaction for programming and controlling the home automation and control system 2 is described in greater detail below.

The home automation and control system 2 illustrated in FIG. 1 does not rely on a central controller. Rather, control is distributed by including programmable intelligence to each device. As will be described below with respect to FIG. 2, this intelligence takes the form of a microcontroller and other circuitry that provides functionality for distributed programming of the home automation and control system 2 to each of the devices in the system. The microcontroller and related circuitry provide a simple programming interface for creating and modifying scenes, and for creating multi-way groups. State machines for implementing the simple programming interface are described below with reference to FIGS. 5–15. The simple programming interface, also called SPI, is actually embedded as part of each system 2 device. As will be better understood from the following description, those skilled in the art will appreciate that the simple programming interface is protocol independent and may be implemented using many types of protocols, such as the Simple Control Protocol, the Universal Plug and Play protocol, the IEEE-1394 protocol, CEBus protocol, Home Plug and Play protocol, PowerBus, and other protocols known to those skilled in the art.

Figure 2:
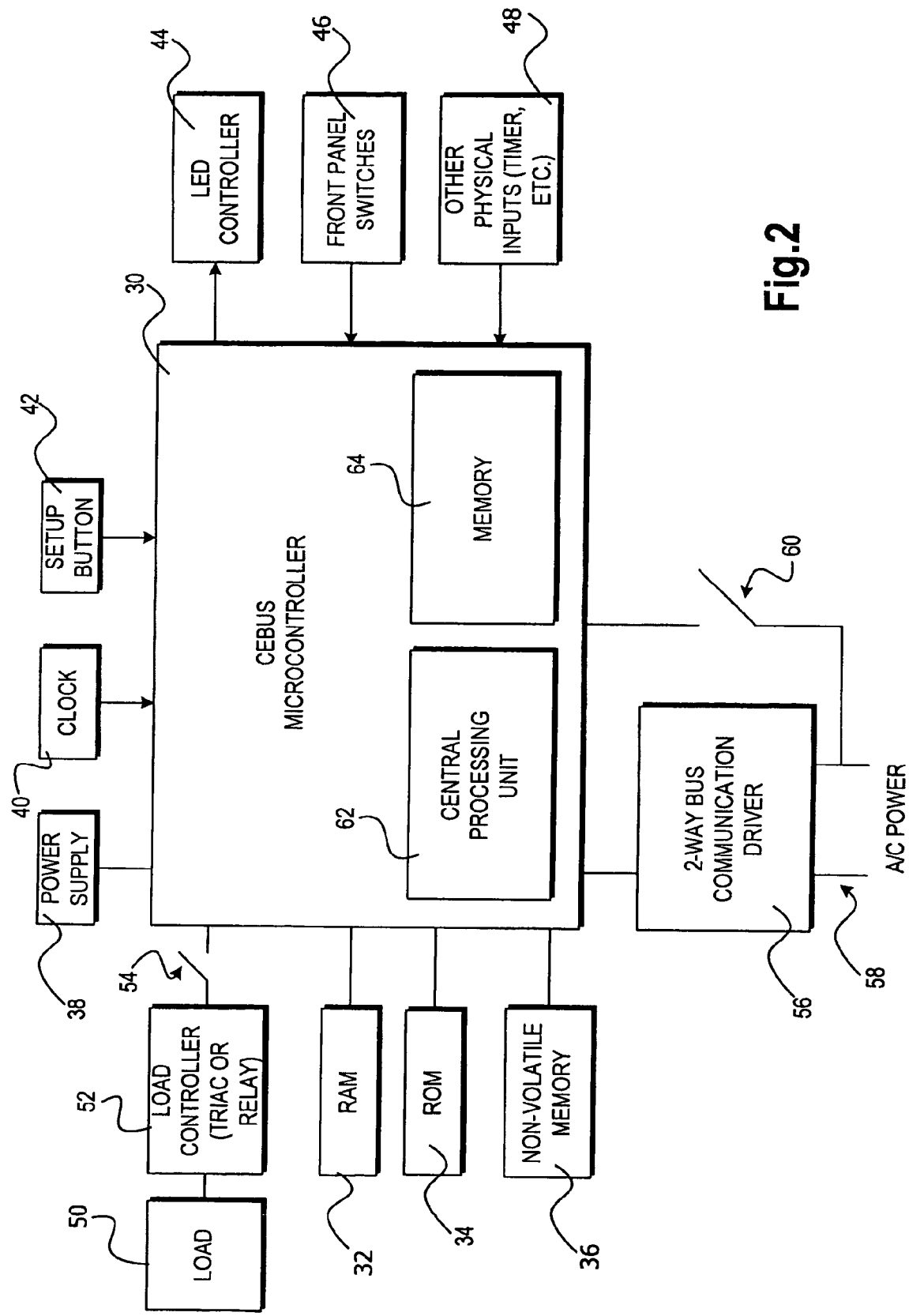
FIG. 2 is a block diagram showing a microcontroller and related circuitry that provides distributed control functionality and a simple programming interface in an actual embodiment of the present invention.

FIG. 2 illustrates a microcontroller and related control logic that provides distributed control functionality and a simple programming interface in the actual embodiment of the present invention described herein. As mentioned briefly above, according to the actual embodiment of the present invention described herein, preferably, the microcontroller and associated circuitry shown in FIG. 2 is incorporated into each device included in a home automation and control system. By incorporating such circuitry in each device, control of the home automation and control system can be equally distributed to each device. Incorporating the same microcontroller and associated circuitry in each device results in each device in the system presenting the same simple programming interface to the user. In this manner, once a user has learned how to program and control one device, the user can easily program and control other devices.

At the heart of the microcontroller and related control logic shown in FIG. 2 is a CEBus® microcontroller 30. The CEBus® microcontroller 30 comprises a central processing unit 62 and internal memory 64 for executing user programs, paired with functionality for interfacing with a power-line networking protocol, such as the CEBus® protocol from the CEBus® Industry Council, Inc. As known to those skilled in the art, the CEBus® standard (EIA-600) is an open standard for home automation and control that defines a common language for device communication over various media, including power lines. Those skilled in the art should appreciate that while the CEBus® protocol is utilized for device communication in the actual embodiment of the present invention described herein, other types of protocols may also be utilized.

In the actual embodiment of the present invention described herein, the CEBus® microcontroller 30 comprises a CEWay PL-One from the Domosys Corporation of Sainte-Foy, Quebec, Canada. The CEWay PL-One is a power line transceiver integrated circuit that integrates the CEBus® physical layer and embeds an 8052 microcontroller core. The CEWay PL-One includes 256 bytes of internal data memory, three 16-bit timers/counters, a full duplex serial port, and the ability to access up to 64 kb of external data memory and up to 64 kb of external code memory.

In the embodiment of the invention described herein, the CEWay PL-One is paired with an external random access memory ("RAM") 32, an external read-only memory ("ROM") 34, and a writable non-volatile memory 36, such as flash memory. As will be described in greater detail below, the non-volatile memory 36 may be used to store and retain scene settings for the device when power is removed. These memory devices may also store computer-readable instructions, data structures, program modules or other data necessary for providing the functionality described herein.

The CEBus® microcontroller 30 is also paired to a load 50 through a load controller 52. The load 50 comprises an electrical load, such as that provided by a lamp, electrical equipment, or other home appliance. The load controller 52 may be capable of sensing the level of the load 50 and is capable of setting the load 50 to a particular level. The load controller 52 communicates to the CEBus® microcontroller 30 so that sensing the level of the load 50 or setting the load 50 to a particular level may be accomplished under programmatic control. According to the actual embodiment of the present invention described herein, the load controller 52 may comprise a triac, for gradually varying the level of a load, or a relay for switching a load on or off. Other types of load control devices such as latching relays, bi-state relays, or other devices known to those skilled in the art may be utilized. The load 50 and load controller 52 may also be electrically isolated from the CEBus® microcontroller 30 through the use of a switch 54, such as an air-gap switch.

The CEBus® microcontroller 30 may also interface with an alternating current ("A/C") power line 58 through the use of a two-way bus communication driver 56. The two-way bus communication driver 56 receives data transmitted on the A/C power line 58 and converts this data to a signal compatible with the CEBus® microcontroller 30. The CEBus microcontroller 30 may be electrically isolated from the A/C power line 58 through the use of a switch 60, such as an air-gap switch. As known to those skilled in the art, the CEBus® microcontroller 30 may also receive electrical power from a power supply 38 and a clock signal from a clock 40.

The CEBus® microcontroller 30 also interfaces with several input and output devices. In particular, the CEBus® microcontroller 30 interfaces with a light emitting diode ("LED") controller 44. The LED controller 44 provides functionality for driving one or more LEDs mounted on the device. As will be described in greater detail below, the LEDs may be used to provide an indication to the user as to whether the device is in a normal operation mode, a programming mode, or in another state.

The CEBus® microcontroller 30 also receives input from a number of front panel switches 46. The front panel switches 46 may be mounted on a panel of the device accessible to the user. These switches may be utilized to control a local load 50, or to trigger a scene that includes other devices. Additionally, a dedicated setup button 42 is provided for placing the device into a programming mode. According to the actual embodiment of the present invention described herein, the setup button 42 is located behind a face plate of the device to prevent inadvertent selection of the programming mode. Other physical inputs 48 may also be provided to the CEBus® microcontroller 30, such as a timer. The front panel switches 46 and the setup button 42 are described in greater detail below with respect to FIGS. 3A–3C.

Referring now to FIG. 3A, an illustrative switch device 10 will be described. In the actual embodiment of the present invention described herein, the switch device 10 provides a primary interface for a user to the home automation and control system. In particular, the switch device 10 may be utilized by the user to control a local load, to program a scene, and to trigger a scene. In this regard, the switch device 10, including the CEBus® microcontroller and related circuitry, is mountable within a standard wall-mount switch plate receptacle. Those skilled in the art should appreciate that while the switch device 10 is described herein as the primary interface to the home automation and control system, the functionality and interface provided by the switch device 10 for controlling loads, programming scenes, programming multi-way groups, controlling multi-way groups, and launching scenes may be similarly provided by other types of devices.

As described above, the switch device 10 includes the CEBus® microcontroller and related circuitry for interfacing with the home automation and control system and for providing the simple user interface. The switch device 10 also includes one or more buttons 70A–70B. In the actual embodiment of the present invention described herein, one of the buttons 70A is dedicated for local load control. The local load control button may utilize a dimmer to gradually change the value of the local load to which the switch is connected, such as a light. Alternatively, the local load control button may be utilized in connection with a relay for turning the local load on or off.

If the local load control button utilizes a dimmer, the button may be held down to gradually ramp the local load from an off state to a maximum value state. When the local load reaches its maximum value state, the dimmer may then gradually return the load to its off state. As will be described in greater detail below, scenes may be assigned to the remaining button (70B in FIG. 3A) or buttons (70B and 70C in FIG. 3B or 70B, 70C and 70D in FIG. 3C) on the switch device 10. These buttons may then be utilized to trigger the assigned scene. Those skilled in the art should appreciate that the switch device 10 may be provided in a three-button 70A, 70B, 70C or four-button 70A, 70B, 70C, 70D configuration as shown in FIGS. 3B and 3C, respectively. Other configurations of the buttons on the switch device 10 will be apparent to those skilled in the art.

The switch device 10 also includes a visible LED 74. In the actual embodiment of the invention herein described, the LED 74 comprises a tri-state LED capable of displaying the colors red, amber, and green. The LED 74 provides a visual indication to a user regarding the current state of the switch device 10. For instance, one color of the LED 74 may indicate to the user that the switch device 10 is in a programming state and another color may indicate that the switch device 10 is in a normal operating state. The LED 74 may also be flashed in patterns in combination with the colors to provide other types of notifications. The LED 74 is controlled by the LED controller 44 described above with reference to FIG. 2.

The switch device 10 also comprises a setup button 42. As will be described in greater detail below, the setup button 42 is utilized to place the switch device 10 into one or more programming modes. In order to avoid inadvertent selection of the setup button 42, preferably, the setup button is positioned so as to avoid accidental presses. In the actual embodiment of the invention, the setup button is mounted behind a switch device cover 78. In order to access the setup button 42, therefore, a user must remove the retaining screws and the switch device cover 78. If the local load control button utilizes a dimmer, then the switch device 10 also includes an air-gap switch 72 for electrically isolating the local load from the power source.

Figure 4:
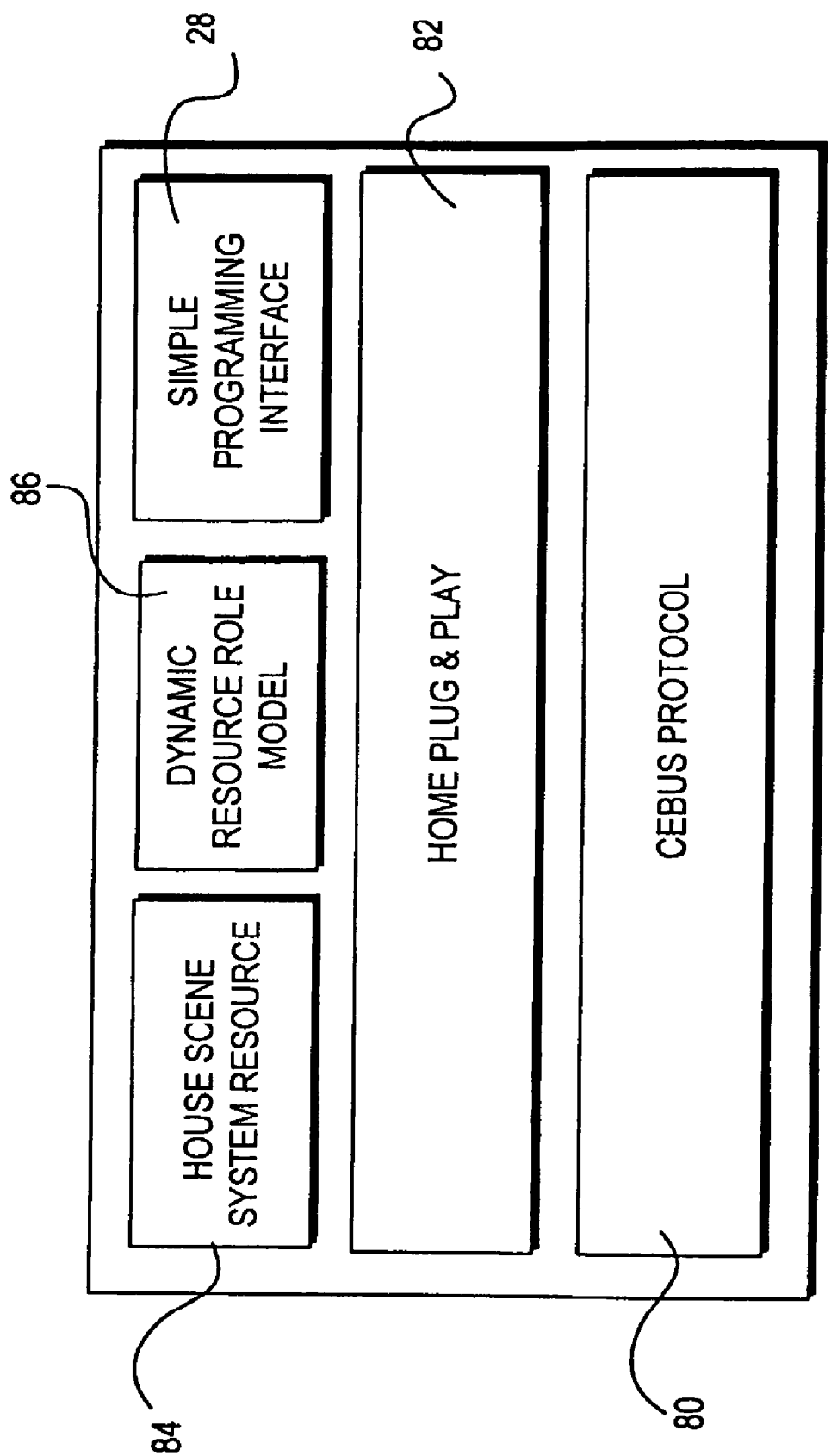
FIG. 4 is a block diagram showing the software architecture utilized in an actual embodiment of the present invention.

FIG. 4 illustrates a software architecture for implementing aspects of the present invention. As described briefly above, each device utilized in a home automation and control system according to the present invention includes a microcontroller and related circuitry for providing a simple programming (SPI) interface 28. To provide such functionality, each device implements the CEBus® protocol 80 for low-level communication.

As known to those skilled in the art, the CEBus® protocol uses 120v, 60-cycle, electrical wiring to transport messages between devices. Particularly, the CEBus® protocol 80 uses spread spectrum technology to overcome communication impediments found within electrical powerlines. Spread spectrum signaling works by spreading a transmitted signal over a range of frequencies, rather than using a single frequency. The CEBus® protocol 80 spreads its signal over a range from 100 Hz to 400 Hz during each bit in a data packet. However, instead of using frequency hopping or direct sequence spreading, the CEBus® protocol 80 sweeps through a range of frequencies as it is transmitted. As mentioned above, the CEWay PL-One from the Domosys Corporation implements the physical layer of the CEBus® protocol 80. Other layers of the CEBus® protocol 80 may be implemented in software.

One layer above the CEBus protocol 80 sits the Home Plug & Play protocol 82, also from the CEBus Industry Council, Inc. The Home Plug and Play protocol 82 implements the Home Plug and Play Specification that provides a uniform implementation for using the Common Application Language ("CAL")(EIA-721), from the Electronic Industries Alliance ("EIA"), as a language for inter-device communication. CAL is a high-level command language used by devices for communication over CEBus®. The Home Plug and Play protocol 82 provides uniform implementation rules for CAL, accommodates various communication protocols so that it works with multiple home network transports, defines common household objects through an object-oriented language, formalizes status, listener, and request objects, uses loose coupling to share status reports, and provides other functionality as known to those skilled in the art.

A house scene system resource 84, a dynamic resource role model 86 and the SPI 28 all sit above the Home Plug and Play protocol 82. While the house scene system resource 84, the dynamic resource role model 86 and the SPI 28 can be implemented independently of each other, they are preferably used together. When used together, the house scene system resource 84, the dynamic resource model 86, and the SPI 28 maximize the benefits separately provided by each of these elements. Therefore, all three are used in the preferred and actual embodiment of the present invention described herein. The house scene system resource 84 when combined with the SPI 28 creates both distributed programming and distributed control with no single point of failure. The dynamic resource role model 86 enables a more efficient and compact implementation of the house scene resource 84 and the SPI 28.

The house scene system resource 84 provides a way of creating scenes where each system device maintains house scene definitions describing the state settings of the device for each house scene in which the device participates as a house scene member. Each house scene is assigned a unique house scene identifier. This allows one simple, short message containing the scene identifier to launch a scene regardless of the number of scene members. House scenes are created by having each individual device, when given an indication to learn a new house scene, locally save its membership status and its current device state. The membership status and the current device's state are associated with the house scene identifier for recall when a scene is launched in the manner described herein. If a device is given an indication that the device is not a member of a particular house scene, the device is not required to save any house scene information. Scene trigger buttons (70B, 70C, 70D, FIGS. 3A–3C) are programmed by having the designated scene trigger button, when given an indication to learn a new house scene, locally save and associate the house scene identifier with that particular scene trigger button. Thereafter, when a scene trigger button that has learned or been associated with a house scene identifier is activated, it launches the house scene by broadcasting a launch command to the entire system that contains the associated house scene identifier. When a device in the system receives a broadcast scene launch command and the device membership status associated with the received house scene identifier indicates the device is a member of that house scene, the device retrieves from storage the locally saved scene state associated with that house scene identifier and sets itself to that scene state. This allows one simple, short message containing the scene identifier to launch a scene in normal operation with any number of scene members. Preferably, a house scene can also be launched by another entity, such as software running on a personal computer or an external controller, that is able to broadcast a scene launch command containing the house scene identifier for that particular house scene. Each house scene stored by a device includes an internal house scene resource instance or instantiation in the device that is bound to the unique house scene identifier. To enable the device to be a participant of many different house scenes, where the device state in each house scene may be very different, the device requires an internal house scene resource instance for each desired house scene. The system house scene resource method enables a device to be a member of multiple house scenes by providing a method to configure and bind (and unconfigure and unbind) a specific internal device instance to a specific scene identifier. Further details about the System House Scene Resource 84 are described in U.S. patent application Ser. No. 10/154,425, filed May 22, 2002, and titled "Method and Apparatus for Providing Distributed Control of a Home Automation and Control System," the subject matter of which is incorporated herein by reference.

The dynamic resource role model 86 provides a resource management method for subscriber-publisher based automation and control system protocols, such as CEBus 80 and Home Plug and Play 82. In a subscriber-requester based protocol, also called subscriber-publisher protocol, the system consists of device resources made up of "objects" that interoperate with each other depending on their role. The subscriber or member role provides a way for a device resource to be affected by other devices. The requester role provides a way for a device to affect other devices. In normal operation, requester objects from one resource send commands to associated subscriber resource objects. The dynamic resource role model 86 provides dynamic resource object role selection, enables new roles, gives resources the ability to assign allowed roles, and provides for role protection. Preferably, the dynamic resource role model 86 allows the same resource object to have multiple roles. A resource object with both requester and subscriber roles can both affect and be affected by one or more resources. The ability of a resource object to function both as a requester and a subscriber simplifies the implementation of system-wide resources such as house scenes that, unlike device specific resource objects, need a system-wide resource status feedback. The dynamic resource role model 86 provides efficient system-wide system resource status updating. Further details about the dynamic resource role model 86 are discussed in U.S. patent application Ser. No. 10/153,419, filed May 22, 2002, and titled "Method and Apparatus for Providing a Dynamic Resource Role Model for Subscriber-Requester Based Protocol in a Home Automation and Control System," the subject matter of which is incorporated herein by reference.

The simple programming interface ("SPI") 28 provides a simple and consistent interface for programming scenes and multi-way groups within a home automation and control system. The SPI 28 is described in greater detail below with respect to FIGS. 6–19. The SPI 28 draws on both the standard Home Plug and Play protocol 82 and CEBus protocol 80 to perform the needed functionality. Preferably, the SPI 28 also draws on both the system house scene resource 84 and the dynamic resource role model 86 to maximize the benefits of the SPI functionality.

Figure 5:
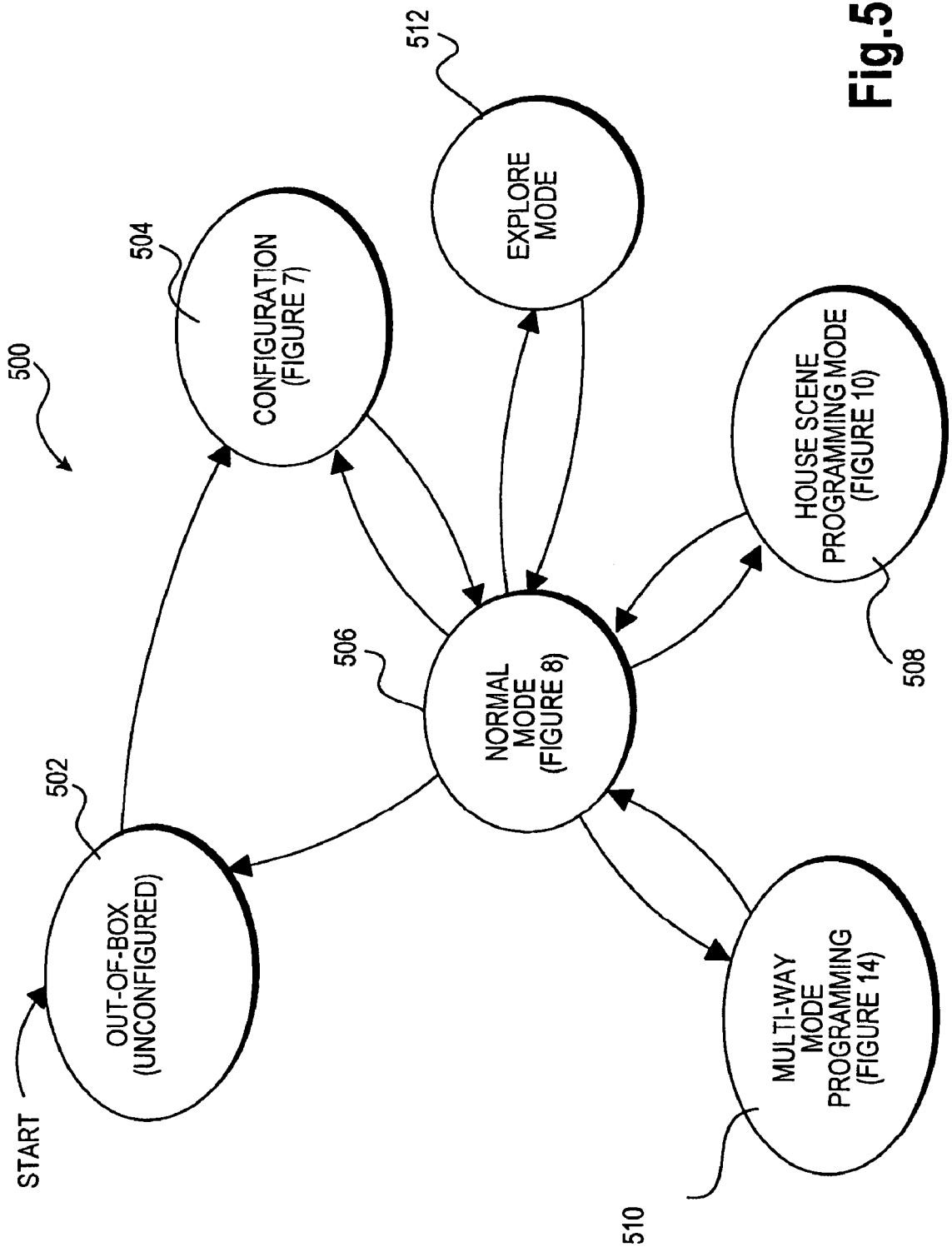
FIG. 5 is a state diagram showing the major states of operation of a home automation and control system device according to an actual embodiment of the present invention.
Figure 6:
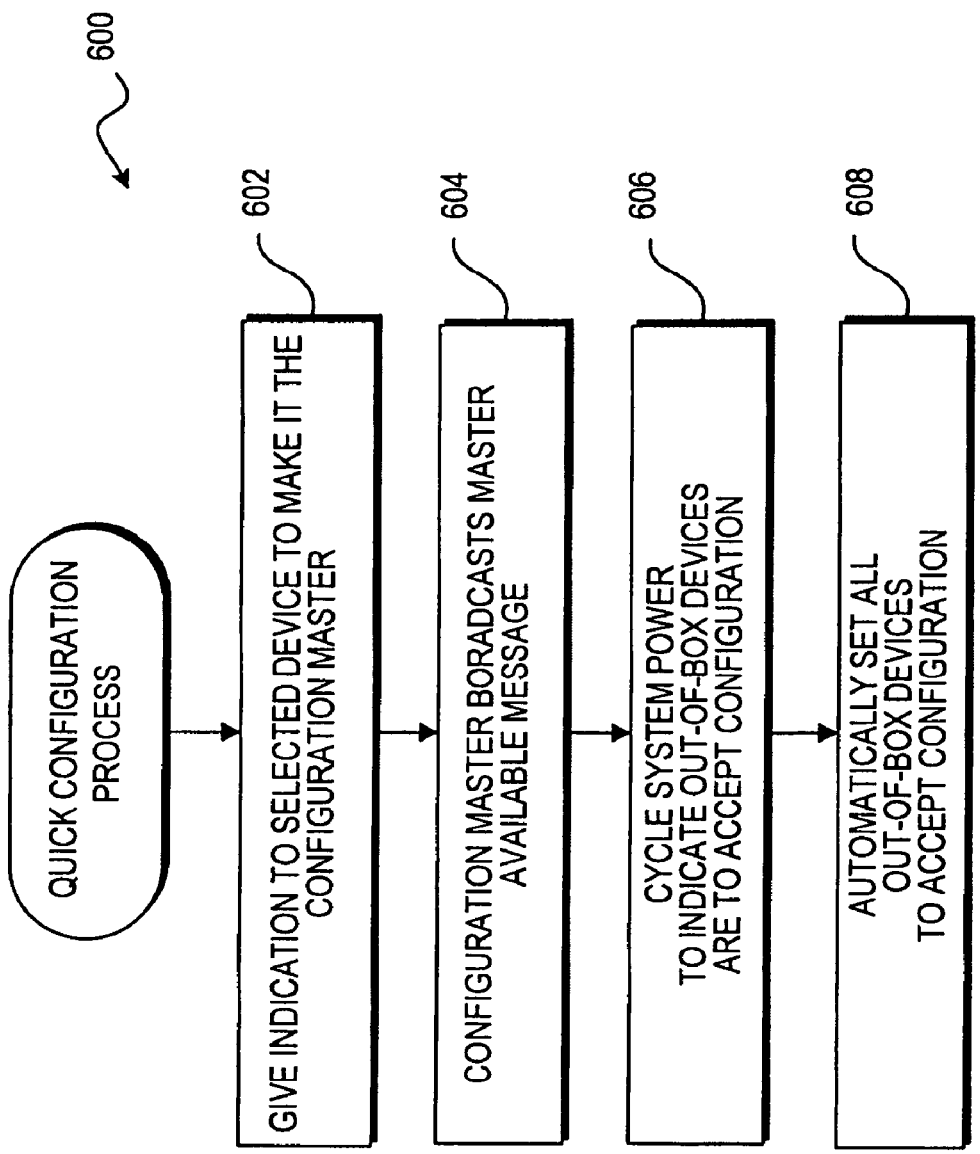
FIG. 6 is a flow diagram showing an illustrative routine for a quick process for configuring a home automation and control system according to an actual embodiment of the present invention.

FIG. 5 depicts an illustrative state machine 500 showing the major states of operation of a home automation and control system device according to the actual embodiment of the present invention described herein. The state machine 500 begins at state 502. State 502 is the "out-of-box" unconfigured state in which a device is shipped from the factory. An unconfigured CEBus device must be configured into an existing or new home automation and control system by providing the device with a network identifier, also called a house code, and a unique unit address within the network identifier, i.e., the house code. To configure the device the state machine 500 moves to state 504. A flow chart showing a process for quickly configuring a new system network is illustrated in FIG. 6 and described below. An illustrative state machine for configuring a new device is described below with respect to FIG. 7. An already configured device (state 506, described below) may be placed temporarily in state 504 to serve as a configuration master, to assure that the other unconfigured devices are configured to use the existing house code in the network configuration process.

Once a new device has been configured at state 504, the state machine transitions to state 506. State 506 is the normal mode of operation for the device. In the normal mode of operation, the device may be utilized to control a local load associated with the device, to remotely control any multi-way group programmatically associated with the device load button, or to launch programmed scenes from a trigger button. An illustrative state machine for the normal mode is described below with reference to FIG. 8. From state 506, the state machine may move to state 512. State 512 provides an "explore mode" through which the serial number, house code, and unit address for a device may be discovered programmatically. When the explore mode is exited, the state machine returns to state 506.

Figure 9:
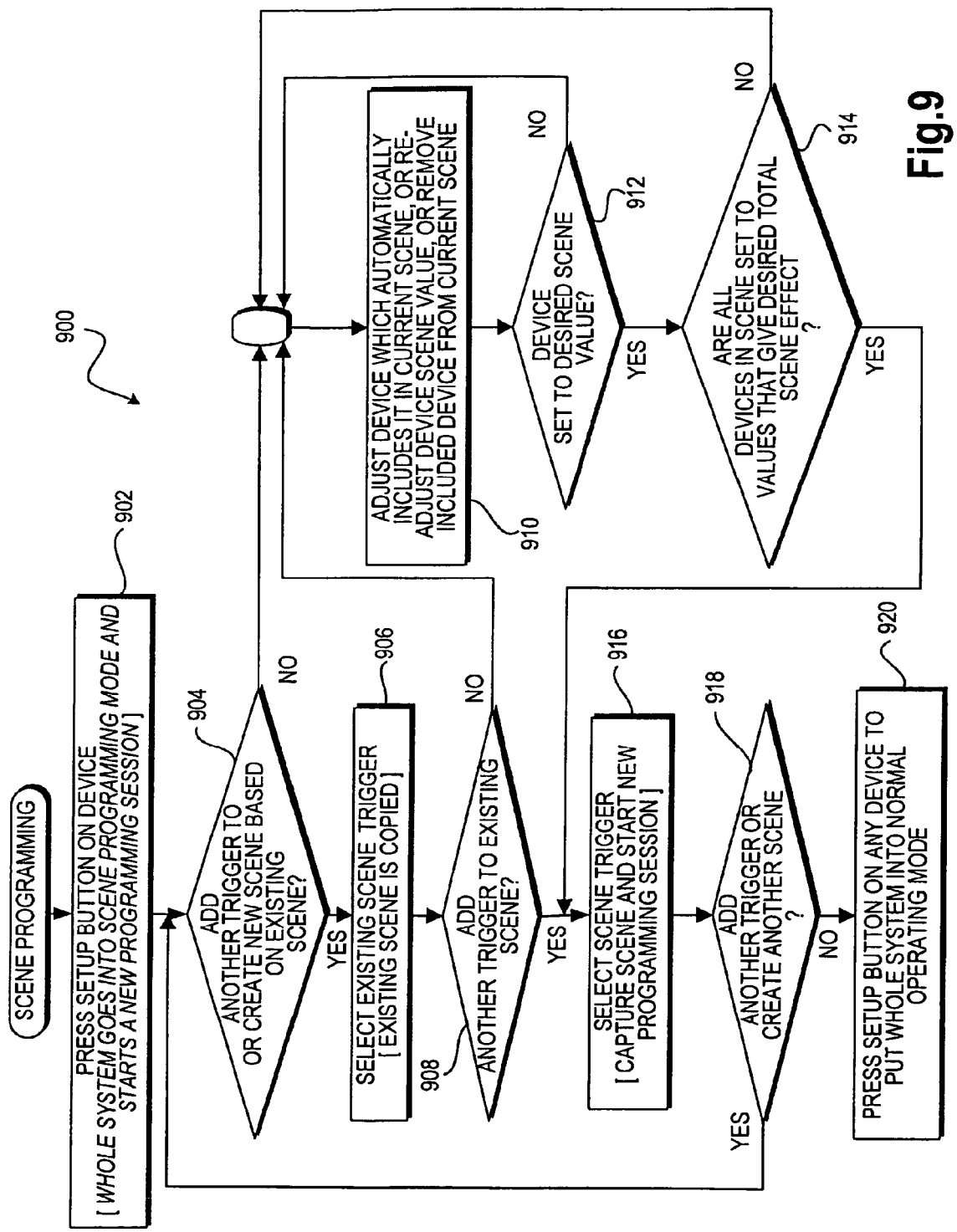
FIG. 9 is a flow diagram showing an illustrative routine for programming scenes in a home automation and control system according to an actual embodiment of the present invention.

From state 506, the state machine may also move to state 508, entering the system-wide house scene programming mode. In the house scene programming mode, system house scenes may be programmed manually using the simple programming interface. A flow diagram for programming a system house scene in SPI is illustrated in FIG. 9 and described below. An illustrative device state machine for the house-scene programming mode is described below with reference to FIG. 10. When the user exits the house-scene programming mode, the state machine returns to state 506.

From state 506, the state machine may move to state 510, entering a system-wide multi-way programming mode. In the system-wide multi-way programming mode, a group of devices may be programmed to directly control each other. When the user has completed programming the multi-way group, the state machine returns to state 506, the normal mode. An illustrative state machine for the multi-way programming mode 510 is described below with reference to FIG. 14. As will be better understood by those skilled in the art from the following description of FIG. 14 and other multi-way programming mode drawings, the SPI 28 could be implemented such that a trigger button could directly control a multi-way group, such as a multi-way group of lights, for example.

Referring now to FIG. 6, an illustrative routine 600 will be described showing a system-wide configuration process called the quick configuration process. Routine 600 begins at block 602 where one of the out-of-box unconfigured devices, or a device configured in an existing network, is selected as configuration master. This selection may be accomplished in a variety of ways, such as by three presses on the setup button 42 (FIGS. 3A–3C) if the device is out-of-box, or two on the setup button if the device is an existing network device in its normal mode. The device goes to state (704, FIG. 7) and gets a network address if it is out-of-box. The thusly designated device then asks all devices on the physical network if they are configuration master (as per NPnP). If no other device defends the configuration "masterness," the designated device becomes the configuration master (state 706, FIG. 7) until given a signal to stop (such as one press on the setup button), or a time out occurs, at which time the device stops being the configuration master and goes to normal mode state. Only one button at a time can be configuration master, and a configuration master will define its "masterness" until it ceases to be the master.

The configuration master puts the rest of the out-of-box devices into a special state (712, FIG. 7) when a configuration master exists. In this state an indication to an out-of-box device will cause it to allow itself to be configured (two presses on the setup button, for example). The same indication (two presses on the setup button) has no effect on the out-of-box device if it has not first been told a configuration master exists and is therefore in the special state. In this manner a nearby out-of-box device that is not intended to be included with a system being configured will not accept configuration into the system even though a configuration master exists for the system, because the out-of-box device has not received an indication to accept configuration in the system.

Figure 7:
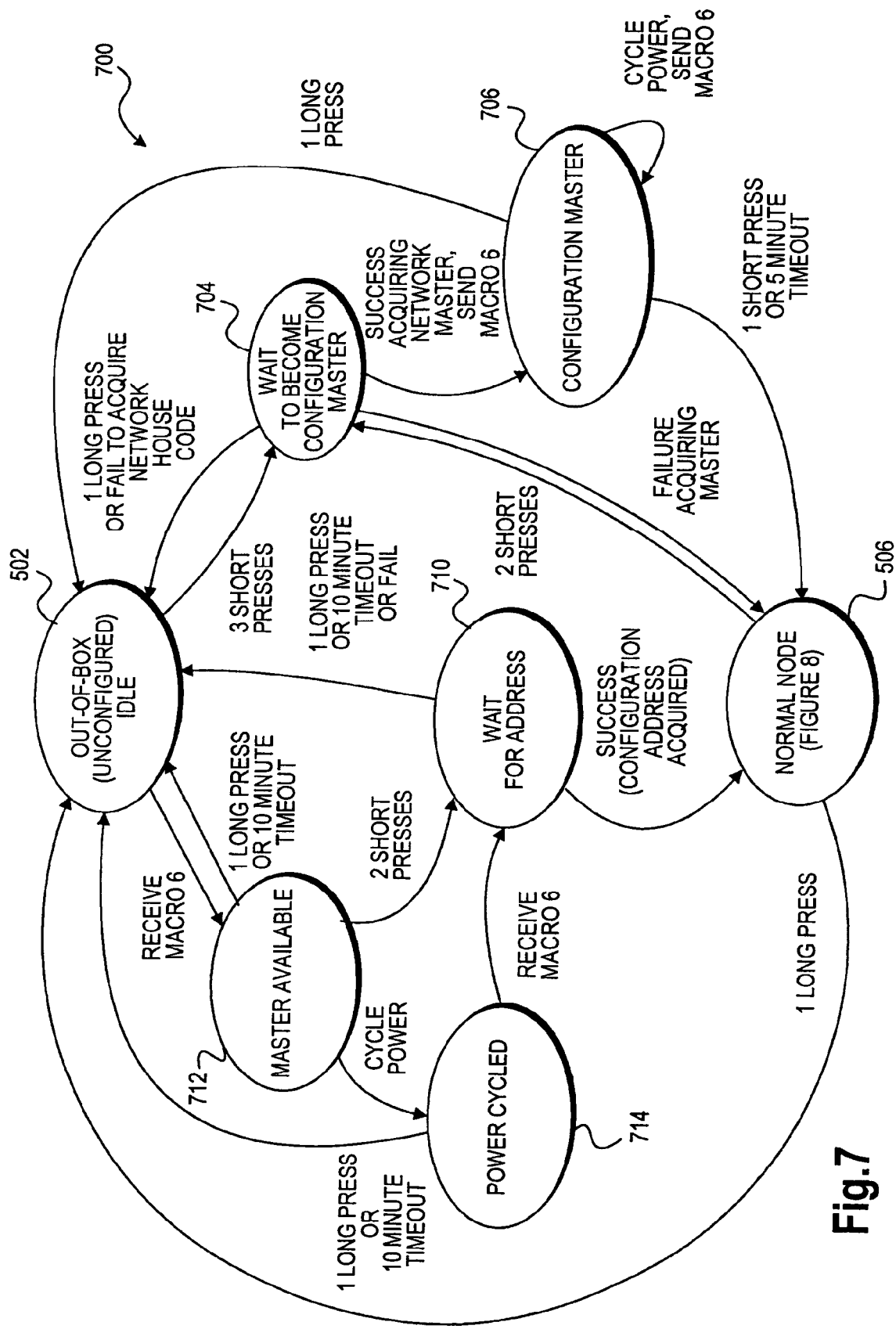
FIG. 7 is a state diagram showing an illustrative state machine for configuring a home automation and control system device according to an actual embodiment of the present invention.

The indications that cause a device to go into the configuration master state are unique to SPI, but the configuration master and out-of-box interaction are implemented in the manner described in HPnP, except for the additional step of adding a "system-wide" indication to all out-of-box devices so that they allow themselves to be configured when power is cycled while they are in the special "I know there is a configuration master" state (712, FIG. 7).

If an out-of-box unconfigured device is selected as configuration master, a new unique network will be created. If an existing network device is the configuration master, out-of-box devices will be configured into the existing network. Becoming a configuration master is temporary since this selection can be changed. Once the selected device becomes the temporary configuration master, the routine 600 proceeds to block 604 where the configuration master sends out a message to the system to advertise that a configuration master is available. The routine then proceeds to block 606 where an indication is given to the system, such as a system-wide power cycle, indicating that all out-of-box devices are to accept configuration. Proceeding to block 608, all out-of-box devices involved in the power cycle are set to be configured by the configuration master. Preferably, the configuration master configures the out-of-box devices using the standard Home Plug and Play (HPnP) protocol 82 manual configuration method steps that apply after an out-of-box device has received an indication to accept configuration. The actual embodiment of the present invention also supports the Home Plug and Play defined manual binding method to automatically configure an out-of-box device. Details of the Home Plug and Play automatic configuration method are detailed in the *Home Plug and Play Specification* document from the CEBus Industry Council, Inc., and are described only briefly herein. In the Home Plug and Play defined manual binding method, each out-of-box is individually provided an indication that the device is to automatically accept configuration from the configuration master. Those skilled in the art will appreciate that the way configuration is manually performed may be different when implementing the SPI 28 based on a protocol other than the Home Plug and Play protocol 82. Those skilled in the art will also appreciate that changes may be made to the quick configuration process, i.e., routine 600, to make the process compatible with other network configurations and protocols.

Turning now to FIG. 7, an illustrative state machine 700 will be described for configuring a 504 home automation and control system device using either the SPI quick power cycle indication or the standard HPnP method of individual indication to an out-of-box device that it should allow itself to be configured. A device begins in the out-of-box state 502 shown in FIG. 5, which is the unconfigured state for a device. As mentioned briefly above, devices come unconfigured from the factory and must be configured into a new or existing network of devices. Unconfigured devices may be configured using the Home Plug and Play protocol 82 manual procedure or may be configured using a quick configuration process of the type shown in FIG. 6 and previously described. According to either process, as previously described with respect to FIG. 6, one device in a network of devices must be made a configuration master. The configuration master configures unconfigured devices in the network by assigning them unique addresses.

To configure devices manually, a manual indication is provided to one device to become the configuration master. As previously noted, this may be accomplished by pressing the setup button 42 on the device a certain number of times. In an already configured device this causes the state of the configured device to change from a normal mode state 506 (FIG. 5) to a wait to become a configuration master state 704 (FIG. 7). In an unconfigured device, this causes the state of the device to change from the out-of-box state 502 to the wait to become a configuration master state 704. When in the wait to become a configuration master state 704, the unconfigured device attempts to become a configuration master for a new network by first acquiring a unique house code for the network. If the device has been previously configured into an existing network, the device will already have a house code. If the unconfigured device cannot obtain a unique house code, the state machine returns to state 502. If the unconfigured device obtains a unique house code, it configures itself. While in the wait to become a configuration master state 704, the previously or newly configured device attempts to become the only officially recognized configuration master. If the device obtains official recognition as the sole configuration master, the state machine 700 changes from the wait to become a configuration master state 704 to the configuration master state 706. As previously described, the device obtains official recognition as the sole configuration master by asking all other devices on the network if they are the configuration master. A positive response to the question would indicate that a configuration master already exists. If no positive response is received, the asking device transitions to the configuration master state 706.

After achieving the configuration master state 706, the configuration master device broadcasts a message to all devices on the physical communication medium, i.e., the network, informing them that a configuration master is available. This message is called macro 6 in the HPnP protocol. If the device in the wait to become master configuration state 704 cannot obtain official recognition as the only configuration master, the state machine transitions to the normal mode state 506. After a device obtains official recognition as the only configuration master, and transitions to the master configuration state 706, the device is then able to assign unique network unit addressees to other unconfigured devices. A manual indication (such as a short, single press of the setup button 42), or a time-out, may cause the state machine 700 to cease being a configuration master and transition from the configuration master state 706 to the normal mode state 506. Another manual indication (such as a long press of the trigger button) may return the device to the out-of-box (unconfigured) state 502.

In order for unconfigured devices to receive a unit address from the configuration master, these devices must first receive notification that a configuration master is available. For these out-of-box devices, the state machine begins in state 502 and moves to a master available state 712 when such an indication (such as the macro 6 message) is received. In order for unconfigured devices to receive a unit address from a device in the configuration master state, the devices must first be placed in a state that allows them to be configured. For the Home Plug and Play protocol 82 manual procedure the device state machine transitions from the master available state 712 and moves to a wait for address state 710 when the Home Plug and Play individual indication is received. In the case of the HPnP protocol, the individual indication is two short presses of the setup button 42. When in state 710, the device waits for a unit address from the configuration master. If a time-out occurs or a suitable manual indication (long press of the setup button) is received, the device is returned to the unconfigured, i.e., out-of-box, state 502. If the device successfully obtains a unit address, the state machine 700 changes to normal mode state 506, which is described below with reference to FIG. 8. From the normal state 506, a configured device may become a configuration master by receiving the appropriate manual indication (two short presses of the setup button 42), as shown in FIG. 7.

As mentioned briefly above, unconfigured devices may also be configured using a quick configuration process 600. According to this process, all previously unconfigured units may be configured by removing the power to the network after a configuration master has been obtained. More particularly, a configuration master is created by providing a manual indication to a previously configured or unconfigured device in the manner previously described. As previously described, when a device becomes the configuration master, the device broadcasts a message to other devices informing them that a configuration master is available (a macro-6 message). This message causes all of the unconfigured devices in the network to move from the out-of-box state 502 to the master available state 712. When the unconfigured devices move to the master available state 712, they save information indicating that a configuration master is active in the network in non-volatile memory. In this manner, master available information is saved even if power is lost. At this point, the person setting up the home automation and control network removes power from the entire network, or to portions of the network supplying power to the unconfigured devices, by cycling a circuit breaker or by other well-known means. When the configuration master device powers up, it returns to it's the configuration master state 706. When the unconfigured devices power up, they transition to a power cycled state 714 and search for the saved master available information. If the saved master available information is located, the unconfigured devices transition to the wait for address state 710. The configuration master then assigns and transmits a unique unit address in the house code to each unconfigured device. Once the house code and unit address have been obtained by a device, the device transitions to the normal mode state 506. If an unconfigured device does not receive a house code and unit address and a time-out occurs, or if a specific manual indication is received, the device will return to the out-of-box (unconfigured) state 502. This quick configuration process allows an entire network to be configured without having to go to each individual unconfigured device and manually instruct each unconfigured device to receive a network address.

Configured devices may also be returned to an unconfigured "out-of-box" state. One issue, however, with returning a device to an unconfigured state is purging any "dangling scene members." A dangling scene member is a member of a scene that cannot be launched because the device that was returned to the unconfigured state comprised the only trigger for the scene in the home automation and control system network. When a device is reset to the unconfigured state, it will cease to operate in any multi-way group or scene trigger or member roles it operated in prior to the reset. If the device was serving as the sole scene trigger, it may be desirable to have that device purge the system of the dangling scene member(s). The trigger availability determination and previous assignment resolution performance process described below with reference to FIG. 12 can be utilized to perform this service.

The home automation and control system devices provided by the actual embodiment of the present invention described herein operate predominately in a state called the "normal mode." Activation of scenes and general control of attached loads occurs while in the normal mode state. This is also the default state at power-up of a configured unit unless power has been cycled while the device was in the programming mode as described above. Those skilled in the art will appreciate that the actions taken by a device in normal mode state are dependent on the method chosen to save and launch system scenes and the protocol used. The home automation and control system devices provided by the actual embodiment of the present invention described herein use the locally stored system house scene resource method 84 to save and launch scenes based on the CEBus protocol 80 and the Home Plug and Play protocol 81.

In order to launch scenes and control a local load, devices have a basic device specific resource context instance and a set of system house scene resource context instances. A context is a collection of instance variables ("IV") together with rules that may alter the variables. A context instance or instantiation is one copy of the context in a device. A device with multiple context instances of the same type has multiple copies of the same context, including multiple copies of each context variable. The basic device's specific contexts are specified in the Home Plug and Play (HPnP) Specification and is therefore described only briefly herein. The house scene resource context allows interoperability between different types of devices by creating a system-wide resource, called house scenes, that is common to all device types. Launching a house scene can modify the behavior of light and heating, ventilation, and air conditioning ("HVAC") devices simultaneously, for instance, without sending separate lighting context and HVAC context commands. This process is described in greater detail below.

House scenes are controlled in a distributed manner. Each device that is a subscriber member to a house scene maintains a scene description that identifies what the device is to do when a message is received indicating that the house scene should be launched. Conversely, a house scene requester trigger is able to launch a house scene without knowing what devices are participating in the house scene, how many devices there are, or what each device is to do.

Each device with a load control may be a subscriber to multiple house scenes. A device may be a requester for as many house scenes as it has trigger buttons, with each trigger button triggering just one house scene. More than one button on a single device can trigger the same house scene. The application firmware executing on the microcontroller in accordance with this invention tracks which house scene, if any, is currently active, meaning that the current state of the device was last set by that particular scene. Each house scene is assigned one device that acts as an administrator and is responsible for maintaining house scene integrity while programming and in normal operation. The administrator role is usually placed with the device whose trigger button first captured that house scene. The administrator role may be transferred to another device if required.

Figure 8:
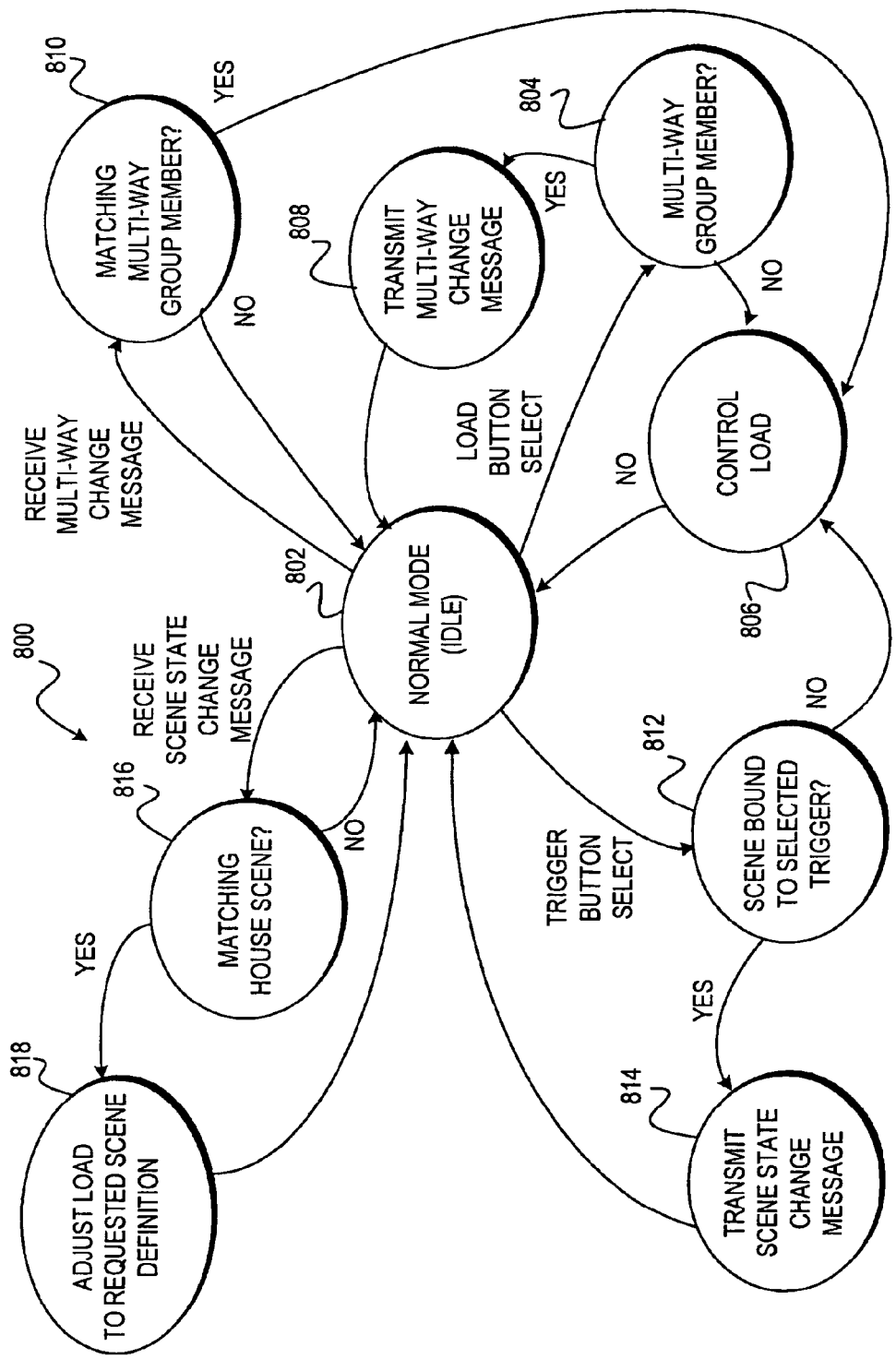
FIG. 8 is a state diagram showing an illustrative state machine for providing a normal mode of operation of a home automation and control system device according to an actual embodiment of the present invention.

Referring now to FIG. 8, an illustrative state machine 800 for the normal mode of operation of a home automation and control system device will be described. The state machine 800 begins operation in the normal mode (idle) state 802. In the normal mode (idle) state 802, the device awaits messages indicating that the device should adjust its load to match a scene definition, awaits messages indicating that the device should adjust its load to match the adjustment of its multi-way group, and awaits input indicating that the local load or its multi-way group should be adjusted or that a scene should be launched. When input is received, the device takes the appropriate action.

If the load button of a device is selected, the state machine 800 transitions from idle 802 to state 804, where a determination is made as to whether the load button is bound to a multi-way group. If the load button has not been bound to a multi-way group the state machine 800 transitions to state 806, where the load is controlled. Control of the load may include turning the load on or off, or ramping the value up or down. After the local load action is completed, the state machine 800 returns to the normal mode (idle) state 802. In state 804, if the load button has been bound to a multi-way group, the state machine 800 transitions to state 808, where a load button press initiates the transmission of a message telling the network what change to make to the multi-way group. When in state 808, the multi-way change message is transmitted by the device whose load button was selected to all devices on the network, including (preferably) the device whose load was selected. After the transmission of the multi-way change message is completed, the state machine 800 returns to the normal mode (idle) state 802. The multi-way change message tells the multi-way group devices how to implement an adjustment to their load.

If a multi-way change message is received, the state machine 800 transitions from idle 802 to state 810, where the device determines if the device is a member of the multi-way group. In particular, the device looks for a matching multi-way group identifier stored in the device's memory. If the device is not a member of the multi-way group identified in the received multi-way change message, the state machine 800 returns to the normal mode (idle) state 802. If the device is a member of the multi-way group identified in the received multi-way change message, the state machine 800 transitions to state 806 where the load is controlled according to the instructions in the received multi-way change message. After the load is adjusted, the state machine 800 returns to the normal mode (idle) state 802.

The actual implementation of the invention uses the standard HPnP protocol 82 defined lighting context number twenty one feature variable as the bases for the multi-way change messages. The feature variable function in the lighting context is detailed in the HPnP Specification, and will therefore not be further detailed herein. Those skilled in the art will appreciate that the actual multi-way change messages used will vary depending on the protocol used and the desired breadth of devices that will be allowed to join a multi-way. The SPI may be implemented with a generic-type multi-way that would allow any type of device that understands a generic multi-way to be bound in a multi-way group together.

If a trigger button of a device is selected, the state machine 800 transitions from idle state 802 to state 812, where a determination is made as to whether the selected trigger button is bound to a house scene. As mentioned above, a house scene is launched when a trigger button is pressed that has been bound to a house scene. If the trigger button has been bound to a house scene, the trigger button press initiates the transmission of a message telling the network what house scene to activate or deactivate. The message does not tell other devices how to implement a particular house scene, it only identifies a particular house scene to be launched. Therefore, if the device determines when in state 812 that the selected trigger is bound to a scene, the state machine moves to state 814. When in state 814, the scene state change message is transmitted by the device whose trigger was pressed to all devices on the network, including the device whose trigger was pressed. Then the device whose trigger was pressed returns to normal mode (idle) state 802. If the selected trigger is not bound to a scene, the trigger button acts like a fixed value load button, and the state machine transitions to 806 where the load is set to the default unbound button value. The device then returns to the normal mode (idle) state 802.

When a scene state change message is received by the device, the state machine 800 changes the normal mode (idle) state 802 to a house matching scene state 816. When in state 816, the device determines if the device is a subscriber of the scene identified in the scene change message. In particular, the device looks for a matching house scene identifier stored in the device's memory. If a matching house scene identifier is not found, the state machine 800 returns to the normal mode (idle) state 802. If a matching house scene identifier is found, the state machine 800 moves to state 818. When in state 818, the local load is adjusted by the device according to the scene definition stored in the device that is associated with the matching house scene identifier. This may include turning the local load on or off, or adjusting the local load to a particular intermediate value. The state machine 800 then transitions from state 818 back to the normal mode (idle) state 802.

An alternative normal mode SPI implemented on devices for which multi-way group membership is not desired would remove states 810, 808, and 804, and if the load button of a device is selected, the state machine 800 transitions from idle state 802 directly to load control state 806. A device receiving a multi-way change message in the idle 802 state would remain in the idle 802 state, since the device could not be a member of the multi-way group. This alternate normal mode SPI implementation can also be applied when a device controls no local load, such as when a device is used only to trigger house scenes. Since the device has no local load button and can therefore never be programmed as a member of a house scene, but can only be programmed as a trigger of a house scene, the 806 and 818 states will never be entered for that device.

The SPI can be implemented in devices that have hardware that inhibits a transmitting device from receiving its own transmissions, by internally transmitting to itself all messages it externally transmits. During manual programming of a scene using the device buttons to set up and assign scene membership, it is important to understand a design concept known as the "current scene." The "current scene" is a temporary set of "elected and incumbent" house scene member loads for the scene being programmed during the current programming session. Election to house scene membership is attained by adjusting the operating state (e.g., light brightness level) of the load controlled by the load button of the related home automation and control system device. Devices whose state machines are in a scene programming mode that receive a command to activate a previously captured scene and that are already members of that previous house scene automatically become incumbent members in the new copied "current scene" being "programmed". Up until the "current scene" is "captured," current scene members can always be removed and new ones added. Once a house scene has been "captured," membership in the scene is fixed and the current programming session ends. The scene can be deleted (overwritten by another scene), copied to another trigger, or have membership in the scene used as the basis for a new scene.

A current scene programming session can also be canceled. The current scene will not survive a transition to the idle state of the programming mode or the termination of a programming session. This means that if a scene is not "captured" before a device transitions to the programming mode (idle) state, the "current scene" will be cancelled. Any membership information related to the current scene will be discarded when such a transition occurs. Typically the transition to the idle state of the programming mode occurs because the user "captures" the scene by assigning the current scene to a trigger button somewhere in the system. When this assignment occurs, the information about scene membership and device scene state become final. The preferred and the actual implementation uses the system house scene resource model where the scene information in each member device is transferred to other permanent internal storage resources available within the device and this information is then associated, or bound, to a unique house scene identifier. This identifier is used to activate the captured load levels that define this scene for each of its members.

Figure 10:
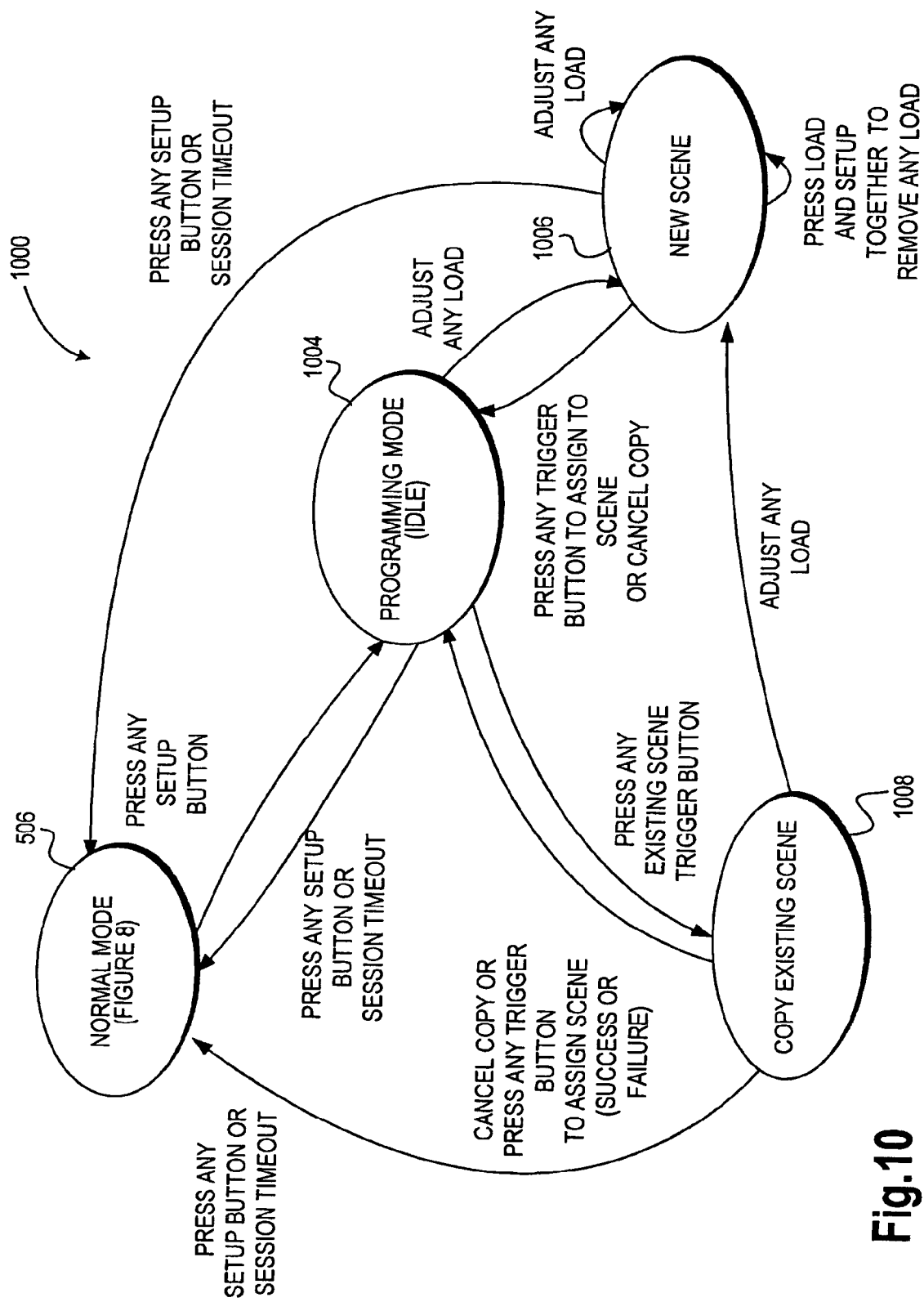
FIG. 10 is a state diagram showing an illustrative state machine for providing a simple scene programming interface in an actual embodiment of the present invention.

The foregoing and other features of scene programming will be better understood from the following description of the flow diagram shown in FIG. 9 and the state diagram shown in FIG. 10.

FIG. 9 is a flow diagram illustrating how the SPI program house scenes. As will be better understood from the following description, the flow diagram combines user actions and device actions.

To understand how the SPI functions during scene programming, it is important to remember that at least one button of a device is dedicated to local load control. Any additional buttons are available for assignment as "triggers" for activating programmed scenes. The load control button is used to set the device scene value and identify the device as a member of the scene, and the trigger buttons are used to select the scene trigger(s) that will initiate the scene launch. In addition, each device has a setup button for programming.

The routine 900 shown in FIG. 9 begins at block 902 where a manual indication is provided to one device in the system to initiate the scene programming mode, such as pressing the setup button once, which causes the whole system to be put into scene programming mode and a new programming session to be started.

Once the system is in the scene programming mode, the routine 900 proceeds to block 904 where a test (described below) is made to determine if the purpose of the current programming session is either to add an additional trigger to an existing scene or to create a new scene based on an existing scene. If the purpose of current programming session is to either add an additional trigger to an existing scene or create a new scene based on an existing scene, the routine 900 proceeds to block 906 where the existing trigger of the existing scene is selected and the existing scene is copied to the current scene being programmed. Once the existing scene is copied, the routine 900 proceeds to block 908 where a test is made to determine if the purpose of current programming session is to add an additional trigger to the copied scene. If the purpose of the current programming session is to add an additional trigger to the copied scene, the routine 900 proceeds to block 916 where the additional trigger for the copied scene is selected.

If the purpose of the current programming session is not to add an additional trigger to the copied scene, but to create a new scene based on the copied scene, then the routine 900 branches to block 910. Likewise, in block 904, if the purpose of the current programming session is not to add an additional trigger to an existing scene or not to create a new scene based on an existing scene, the routine 900 branches to block 910.

At block 910, the current scene is created or modified by the adjustment of a device load. If the adjusted device is not previously a member of the current scene, the adjustment causes it to become a current scene member. In block 910, the current scene can also be modified by the removal of a current scene member. Once the device load is adjusted or removed, the routine 900 proceeds to block 912 where a test is made to determine if the device load is set to the desired scene value for that device in the scene. If the device load value is not set to the desired scene value, the routine 900 branches back to block 910 and the device is readjusted. A device may be readjusted as many times as needed until the desired scene value is reached. When the device load value is at the desired scene value, the routine 900 continues to block 914 where a test is made to determine if any more devices need to be included, adjusted, or removed to get the total desired scene effect. If one or more devices need to be included, adjusted, or removed to get the total desired scene effect, the routine 900 branches back to block 910 to other devices to be included, adjusted, or removed. After adjusting a device, a different and previously adjusted device may be revisited again for additional adjustment(s). The devices of scenes with multiple devices may be adjusted in any order, and may be revisited for additional adjustment or removal at any time. Each current scene member device may be adjusted as many times as desired to get the desired total scene effect. In essence, the loops created by test blocks 912 and 914 are user input wait loops.

From block 914, if no more devices need to be included, adjusted, or removed to get the total desired scene effect, the routine 900 proceeds to block 916 where a trigger for the scene is selected. Selection of the scene trigger captures the current scene, completes the current programming session, and starts a new programming session. From block 916 the flow proceeds to block 918 where a test is made to determine if there is another trigger to be added to the existing scene or if another scene is to be programmed. If the existing scene needs another trigger added to it or another scene is to be programmed, the routine 900 returns to block 904. If there is no more programming to be done, then the flow proceeds to block 920 where a manual indication is provided to one device, such as pressing the setup button once, where the setup button press initiates the transmission by the device of a message telling the network to transition to the normal operating mode state 506.

FIG. 10 illustrates a state machine 1000 for implementing the programming of scenes using SPI, described above, employed by an actual embodiment of the present invention. Scenes are programmed when a device is in a scene programming mode. The state machine 1000 begins with the device being in the normal mode state 506, described above with reference to FIGS. 5 and 8. Pressing the setup button once on any device causes the state machine 1000 of all devices on the network to transition to their programming mode (idle) state 1004. In this way a system-wide house scene programming mode starts and a house scene programming session is initiated. More specifically, the device whose setup button is pressed to establish the programming mode broadcasts a system mode change message to all members of the system. Preferably, a feedback indication that the system devices are in the scene programming mode is provided, by the device LED 74 flashing red rapidly, for example.

Because the actual implementation uses the system house scene resource model, the house scene to be captured in this implementation requires a unique house scene identifier. If it is not desirable to wait for a unique house scene identifier to be acquired at scene capture time, this process can be done in the background. Background processing results in an appropriate unique house scene identifier for the new house scene being available when the scene is captured. The background house scene identifier acquisition in programming mode is implemented by designating one home automation and control system device as the programming mode initiator ("PMI"). This device is responsible for obtaining the unique house scene identifier for each programming session. The PMI duties can be assigned to the device used to initiate the scene programming mode, or can be assigned to a particular device such as a central controller or programmer. The actual embodiment being described herein assigns the background house scene identifier acquisition (also called background identifier hailing duties) to the device used to initiate the scene programming mode. The actual embodiment uses the dynamic resource role model to efficiently perform background identifier hailing. Details of performing background identifier hailing using the dynamic resource role model are detailed in U.S. patent application Ser. No. 10/153,419, filed May 22, 2002, and titled "Method and Apparatus for Providing a Dynamic Resource Role Model for Subscriber-Requester Based Protocols in a Home Automation and Control System" and incorporated herein by reference.

As described above, it may be necessary for a user to remove the cover plate of a switch device to gain access to the setup button. Any number of house scenes can be programmed while the system is in house scene programming mode. The house scene programming mode does not end until the system devices are commanded to transition back into the normal state 506. This may be accomplished by pressing the setup button on a device, which ends the system-wide house scene programming mode and initiates the system-wide normal operation mode. The device whose setup button is pressed establishes normal mode by broadcasting a system mode change message to all system devices. The return to normal mode may also be accomplished by the programming session timing out due to the absence of user input during a preset period of time. Preferably, feedback indication that the system devices are in the normal mode 506 is provided, by the device LED 74 showing solidly green if the device has a local load on, or the device LED 74 being off if the device local load is off or if the device has no local load, for example.

While in the programming mode (idle) state 1004, any load button may be utilized to adjust the value of a scene member. When this occurs, the adjusted device initiates a system-wide transition to the new scene state 1006 by broadcasting a notice of scene adjustment to all system devices. The adjusted device provides a feedback indication that it is now a member of the current scene being programmed in this session, by the device LED 74 going solidly red, for example. All devices included as scene members in the current programming scene session will display the "included feedback" indication, and all devices that are not included as scene members at this point in the current scene programming session will continue to display the programming mode feedback indication. Since these indications are different, a user programming the system can see which device or devices are included as scene members at this point in the current scene programming session, and which devices are not included as scene members.

When in the new scene state 1006, the load button of any device already included as a scene member in the current scene may be utilized to adjust the scene value of the device in the current scene. When in the new scene state 1006, the load button of any device not previously included as a scene member in the current scene may be utilized to adjust the value and include the device as a scene member in the current scene. Also, when in the new scene state 1006, the actuation of suitable input devices, such as the load button and the setup button at the same time, or the continuous selection of the load button for three (3) seconds, removes the device from scene membership in the current scene and causes the device to broadcast notice of scene adjustment to all members of the system. Preferably, the removed device provides feedback that it is no longer a member of the current scene in the programming session, by the device LED 74 flashing rapid red, for example. When all members of the new scene being programmed in the current session have had their levels adjusted, a user may select a trigger button on any device to capture the scene by pressing the trigger button. The selected trigger button that captures the scene will launch the scene in normal mode. The device whose trigger button was selected to capture the scene, after completing the scene capture, establishes a new current session by broadcasting a return to programming mode (idle) state change message to all system devices. After a trigger button is chosen and all the devices return to the programming mode (idle) state 1004, their feedback indication changes to the programming mode feedback indication. The system is now ready for another scene to be programmed. The pressing of a device setup button any time the device is in the new scene state 1006, the copy existing scene state 1008 or the programming mode (idle) state 1004 returns the device to the normal mode state 506. The device whose setup button was pressed to return the device to normal mode state 506 places the entire system in normal mode by broadcasting a normal mode state change message to all system devices. The new scene state 1006 is described in greater detail below with reference to FIG. 11.

From the programming mode (idle) state 1004, the state machine 1000 can also transition to a copy existing scene state 1008 by a user pressing an existing scene trigger button. More specifically, an existing scene is copied in this manner, by a trigger button for that scene being pressed as the first event following the initiation of a new house scene programming session. This action transitions the system devices from the programming mode (idle) state 1004 to the copy existing scene state 1008. The device whose trigger button is pressed broadcasts a notice of scene copy message to all system devices. The scene member devices of the copied scene go to their scene states and become incumbent members of the new current scene being programmed. System devices that were not members of the copied scene remain not scene members in the current scene being programmed. The copied incumbent scene member devices also provide an "included feedback" indication, as described above. After a scene is copied, if a new trigger button is immediately selected by being pressed, the new trigger button becomes another "trigger" of the same existing copied scene. The same house scene identifier is used when triggering the scene in normal mode using either trigger. In copy existing state 1008, when a new trigger button is selected, the device binds the scene identifier associated with the copied scene to the trigger button, and initiates a new programming session by broadcasting a programming (idle) mode state change message. In response to the programming (idle) mode state change message, all devices in the system go to the programming mode (idle) state 1004.

A user can also create a scene from an existing scene by copying the scene and modifying it. If, in copy existing scene state 1008, a trigger is not selected, any load button of any system device can be used to adjust the value of a desired or incumbent scene member. If any load button is utilized to adjust the value of a device, the adjusted device broadcasts a notice of scene adjustment message to all system devices. This message causes the state machine 1000 of all the system devices to transition to the new scene state 1006. If the adjusted device was not an incumbent member of the copied scene, the adjusted device will inform the user that it is now a member of the current programming scene by presenting the user with the previously described "included feedback" indication.

The transition from the copy existing scene state 1008 to the new scene state 1006 may also be accomplished by removing any incumbent member device from the current programming session. The removed device broadcasts a notice of scene adjustment message and provides feedback to a user that it is no longer a member of the current scene being programmed session by causing a programming mode feedback indication (such as the device LED 74 flashing rapid red) to be generated. As previously discussed, from state 1006, when all members of the new current scene have had their levels adjusted to the desired values, pressing a trigger button on any device causes the current scene to be captured. The house scene identifier for the new scene will not be the same as the house scene identifier used for the copied scene. The old copied scene still exists, unless it no longer has a trigger because the trigger button selected for the new scene was the only trigger for the old scene. In this case, the old scene is automatically dissolved. If the old scene is dissolved because the selected trigger for the new scene was the only trigger for the old scene, the old house scene identifier may be recycled as the new house scene identifier. As previously mentioned, pressing the setup button on any device ends programming and returns the device to the normal state 506. A time-out may also return the device to the normal state 506. The copy existing state 1008 is also described in greater detail below with respect to FIG. 11.

Figure 11:
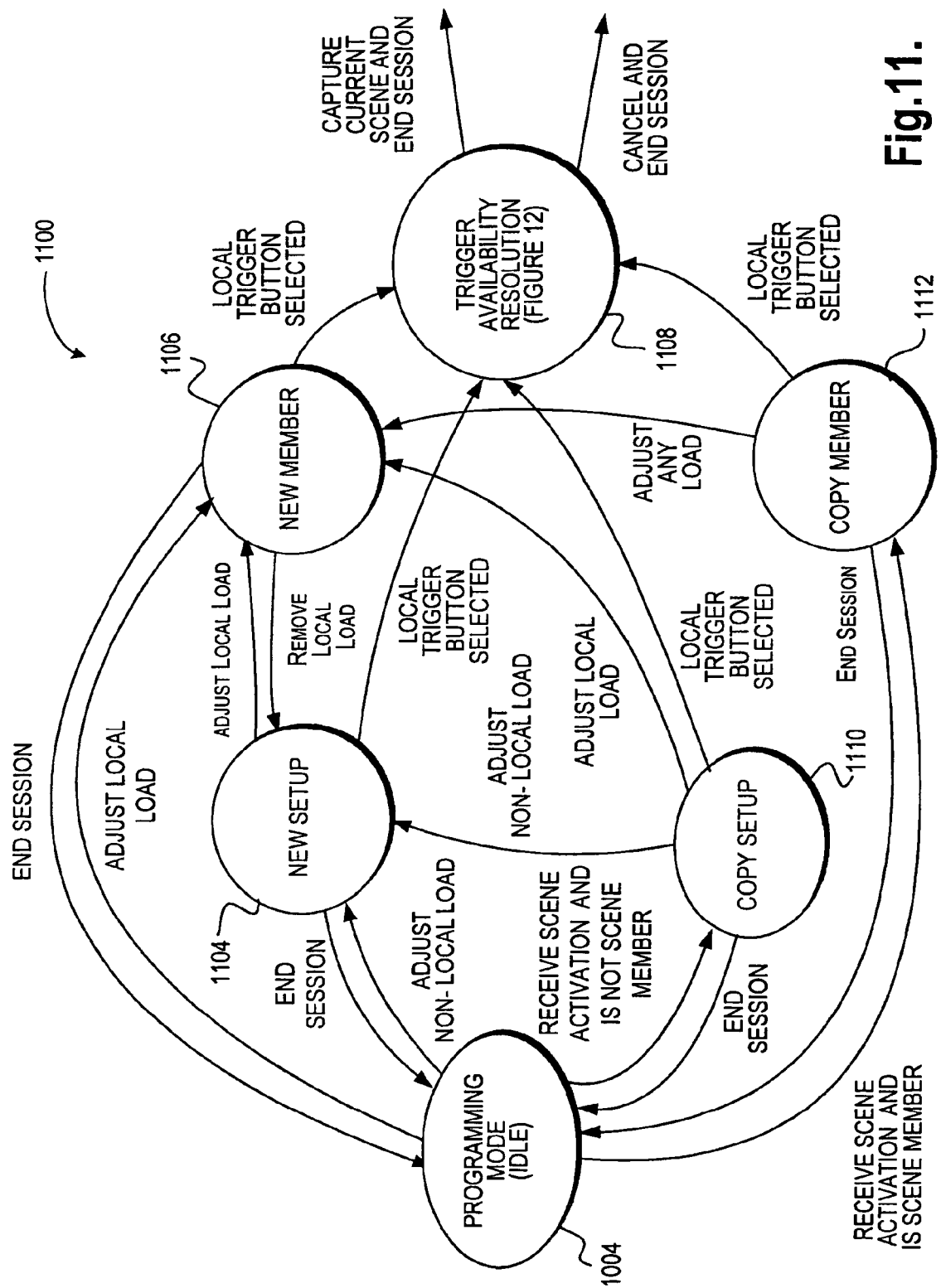
FIG. 11 is a state diagram showing an illustrative state machine for scene copy and new scene sub-states according to an actual embodiment of the present invention.

Referring now to FIG. 11, additional details regarding the new scene and copy existing scene functions will be described. More specifically, FIG. 11 illustrates a state machine 1100 that shows in more detail certain aspects of the new scene and copy scene functions briefly described above with respect to FIG. 10. More specifically, the new scene state 1006, shown in FIG. 10, is shown as two separate sub-states in FIG. 11, a new setup state 1104 and a new member state 1106. The sub-state that a device in the new scene state 1006 is in will depend on whether the device is or is not included in the current scene being programmed. The device is included if it is a member of the current scene being programmed in the session, and is not included if it is not a member of the current scene. If a device in new scene state 1006 is not included in the current scene, the device will be in the new setup sub-state 1104. If a device in new scene state 1006 is included in the current scene, the device will be in the new member sub-state 1106. Similarly, the copy existing state 1008, shown in FIG. 10, is shown as two separate sub-states in FIG. 11, the copy setup state 1110 and a copy member state 1112. The sub-state that a device in copy existing state 1008 is in will depend on whether the device is or is not included in the current scene being programmed. If a device in copy existing state 1008 is not included in the current scene, the device will be in the copy setup sub-state 1110. If a device in copy existing state 1008 is included in the current scene being programmed, it will be in the copy member sub-state 1112. The foregoing sub-states are described below.

As noted above, a device in scene programming mode (idle) state 1004 will broadcast a notification of scene adjustment message when the device's load is adjusted to include it in the current scene. A device in programming mode (idle) state 1004 will also broadcast a notification of scene adjustment message when the device receives a local indication to remove its local load as a member of the current scene. A device enters the new setup sub-state 1104 if the device has not been elected or included as a member of the current scene but has received a notification of scene adjustment message while the device is in the programming mode (idle) state 1004 caused by the adjustment of a non-local load. A device enters the new member sub-state 1106 if the device has been included or elected as a member of the current scene being programmed by it's the device's load being adjusted while the device is in the programming mode (idle) state 1004. A device may also enter the new member sub-state 1106 if the device has been included or elected as a member of the current scene being programmed by its load being adjusted while the device is in the new setup sub-state 1104. The device whose local load is adjusted broadcasts a notification of scene adjustment message to all system devices. If the local load is removed from the current scene, the state machine 1100 transitions back from the new member sub-state 1106 to the new setup sub-state 1104. The device whose local load is removed from the current scene broadcasts a notification of scene adjustment message to all system devices.

A device enters the copy setup sub-state 1110 if a scene copy scene activation message is received while the device is in the programming (idle) state 1004 and the device is not a member of the copied scene. If a scene adjustment notification message is received while the device is in the copy setup sub-state 1110, the state machine 1100 transitions from the copy setup sub-state 1110 to the new setup sub-state 1104. If the local load is adjusted while the device is in the copy setup sub-state 1110, the state machine 1100 transitions to the new member sub-state 1106 and broadcasts a notification of scene adjustment message. A device enters the copy member sub-state 1112 if a scene copy activation message is received while the device is in the programming idle state 1004 and the device is a member of that copied scene.

From the copy member sub-state 1112, the state machine 1100 transitions to the new member state 1106 if the device's local load is adjusted. From the copy member sub-state 1112, the state machine 1100 transitions to the new member sub-state 1106 if a scene adjustment message is received. As noted above, a scene adjustment message is generated by a device if its local load is adjusted or removed from the scene. Thus, a scene adjustment message is received when a non-local load is adjusted or removed from the scene.

As previously described, the selection of a trigger button captures the current scene membership and assigns the scene to the trigger button. If the selected trigger button has been locked, the selection of the trigger button will fail and the current scene will be canceled. If the selected trigger button is not locked, the selection of the trigger button will initiate capture of the scene membership and assign the scene to the selected trigger button. In the preferred implementation, the same scene identifier is bound to the new trigger of a copied scene, such that a selection of the trigger button immediately after a scene has been copied requires only the assignment of the scene identifier to the newly selected trigger button and does not require capture of the scene membership because the copied scene membership has previously been captured.

Figure 12:
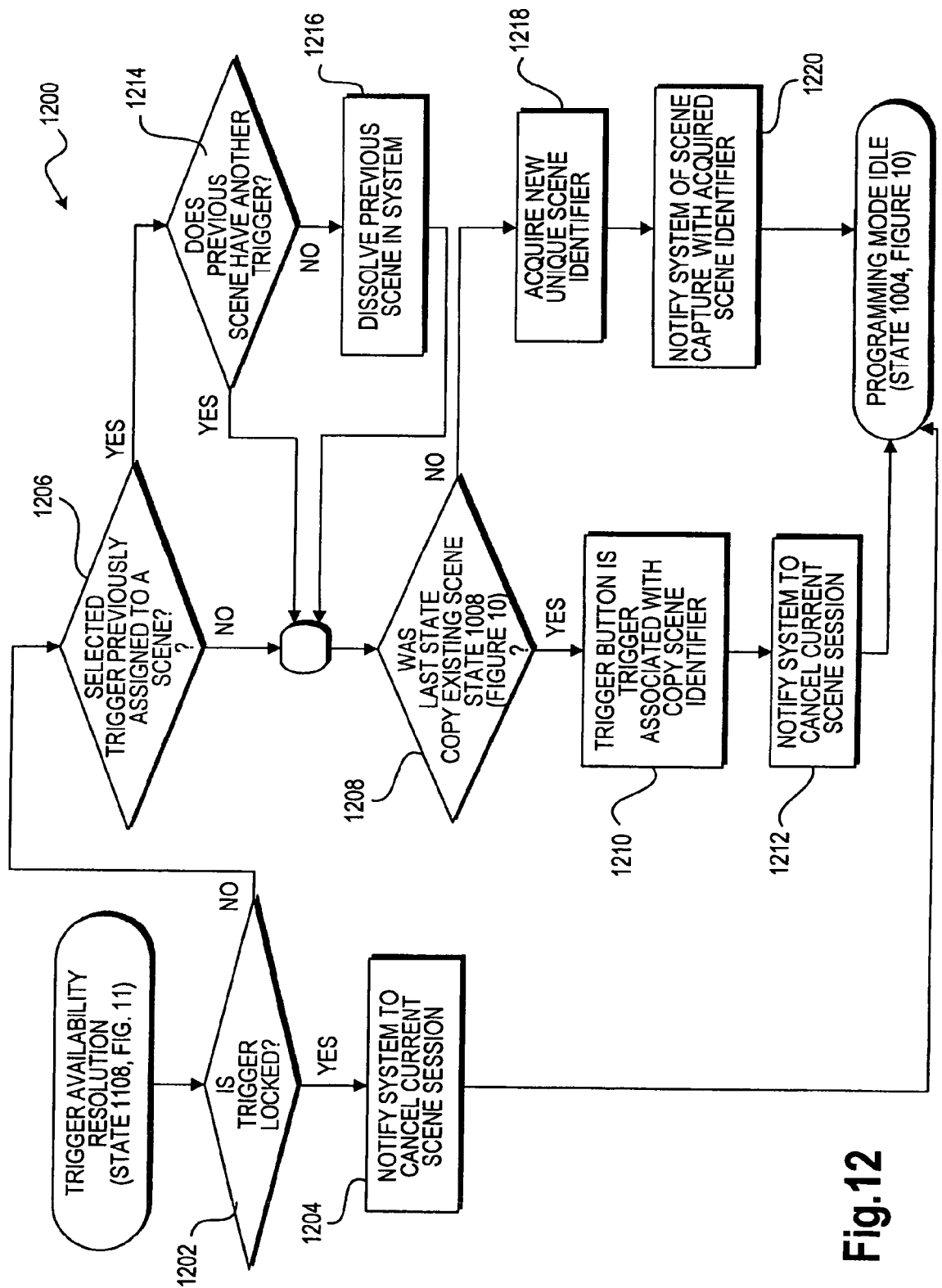
FIG. 12 is a flow diagram showing an illustrative routine for determining trigger availability and performing previous assignment resolution according to an actual embodiment of the present invention.

If a non-local device trigger button is pressed, resulting in the pressed non-local device broadcasting a current scene cancel notification message, when a receiving device is in the new setup sub-state 1104, the new member sub-state 1106, the copy setup sub-state 1110 or the copy member sub-state 1112, the session ends and the device transitions to the programming mode (idle) state 1004. If a non-local device trigger button is pressed to capture the current scene, resulting in the pressed non-local device broadcasting a current scene capture notification message, while a receiving device is in the new setup sub-state 1104 or the copy setup sub-state 1110, and the device is not a member of the captured current scene, the session ends, and the state machine 1100 transitions to state 1004. If a non-local device trigger button is pressed to capture the current scene, resulting in the pressed non-local device broadcasting a current scene capture notification message, while the receiving device is in the new member sub-state 1106 or the copy member sub-state 1112, the device becomes an elected member of the captured current scene that thereafter will respond according to the scene creation and launch method used. The session ends, and the state machine 1100 transitions back to the programming mode (idle) state 1004. The device will save, preferably locally, its current load value associated with the house scene identifier according to the scene creation and launch method used before transitioning to the program mode (idle) state 1004. If a trigger button on a device is selected (pressed) to capture the current scene while the device is in the new setup sub-state 1104, new member sub-state 1106, the copy setup sub-state 1110 or the new member sub-state 1112, the device transitions to the trigger availability resolution state 1108, described below with respect to FIG. 12. When in the trigger availability resolution state 1108, the device determines if the selected trigger button can properly be made a trigger for the current house scene. The trigger assignment may result in the current scene being cancelled or captured. The trigger availability analysis ends the current session by causing the current scene to be captured or canceled, and the state machine 1100 to be returned to the programming mode (idle) state 1004, after broadcasting a capture or cancel notification message to the other system devices. If the trigger assignment results in the current scene being captured and the trigger device is a member of the current scene, the device becomes an elected member of the captured current scene that thereafter will respond according to the scene creation and launch method used. At this point the device will process the captured membership and device scene state information according to the scene creation and launch method used, preferably saving it locally, before transitioning to programming mode (idle) state 1004. A flow diagram showing one way of implementing the trigger availability analysis is illustrated in FIG. 12 and described below. The state machine 1100 also transitions to the programming mode (idle) state 1004 from the copy member sub-state 1112, the copy set sub-state 1110, the new member sub-state 1106, and the new setup sub-state 1104 if no session activity happens for more than a preset amount of time since the last session activity.

Turning now to FIG. 12, an illustrative routine 1200 for determining the availability of a trigger button selected to capture the current scene being programmed will be described. The routine 1200 begins at block 1202, where a test is made to determine if the selected trigger button is locked so that its programming cannot be modified. If the selected trigger button is locked, the routine 1200 branches to block 1206. If the selected trigger button is not locked, the routine 1200 branches to block 1204. At block 1204, the system is notified that the current scene is cancelled, and the system transitions to the programming mode (idle) state 1004 and a new programming session is started.

At block 1206, the selected trigger button current scene assignment status is checked, i.e., a test is made to determine if the selected trigger button has previously been assigned to a scene. If the trigger button is currently unassigned to any scene, the routine 1200 branches to block 1208. If the trigger button has been previously assigned to a scene, called the old scene, the routine 1200 branches to block 1214. At block 1214, a test is made to determine if the previous (old) scene has another trigger. If at least one other trigger for the old scene exists, the routine 1200 branches to block 1208. If there are no other triggers for the old scene, the routine 1200 continues to block 1216 were the old scene is dissolved. Once the old scene is dissolved, the routine 1200 proceeds to block 1208.

At block 1208 a test is made to determine if the selected trigger button is capturing a copied scene (state 1008, FIG. 10) to a new trigger or if the selected trigger button is capturing a new scene (state 1006, FIG. 10). If the selected trigger button is capturing a copied scene to a new trigger, the routine 1200 continues to block 1210. At block 1210, the trigger button is associated with the copied scene identifier. Then the routine proceeds to block 1212. At block 1212 the device notifies other system devices that the current scene is canceled (because the scene already exists and does not need to be recaptured). From block 1212 the routine 1200 returns to the programming mode (idle) state (state 1004, FIG. 10).

Returning to block 1208, if the selected trigger button is capturing a new scene, the routine 1200 branches to block 1218. At block 1218, a new unique scene identifier is acquired. Those skilled in the art will appreciate that the method of acquiring a new unique scene identifier is dependent on the protocol used to implement the SPI. The actual embodiment described herein uses the dynamic resource role method to enable an effective background resource hailing routine. This method is discussed in detail in the U.S. patent application titled "Method and Apparatus for Providing a Dynamic Resource Role Model for Subscriber-Requester Based Protocols in a Home Automation and Control System," more fully referenced above and incorporated herein by reference.

After the unique scene identifier has been acquired, the routine 1200 proceeds to block 1220 where the system is notified of the scene capture by broadcasting a scene capture notification message containing the acquired scene identifier. Thereafter, the routine ends and the device transitions to the programming mode (idle) state 1004. Those skilled in the art will understand that the actions occurring in block 1220 may vary depending on the selected scene capture and launch method. The actual embodiment uses the system house scene resource model. When the devices receive the scene capture notification message, those devices that are current scene members save their current device state value as the scene value associated with the scene identifier that was included in the scene capture notification. Therefore, only the scene capture notification is required of the trigger device (block 1220) to capture the scene. If some other scene capture and launch method is used, additional activities may be required before the scene is captured.

Scenes result in all devices that are members of a scene to enable their scene values when activated. A device may be a member of many scenes. Multi-way groups are different. Each device load button can be a member of only one multi-way group at a time. To better understand multi-way groups, it is important to remember that at least one button of a device controlling a load is dedicated to local load control. Any additional buttons are available for assignment as "triggers" for activating programmed scenes. A multi-way group is a group of one or more load control buttons that act in synchronization in response to the operation of the load control button of any device that is a member of the multi-way group. The load control button programmed on any multi-way group member becomes a trigger for the multi-way group and directly controls the load of all other devices in that multi-way group as if the devices themselves were directly controlling the load. All multi-way group devices respond in the same way to the multi-way commands received from any multi-way trigger, but all multi-way group devices do not have to be identical. Multi-way commands can cause the multi-way group members to turn off, turn on, or move their load value in one direction or another. For example, dimmable light devices in a multi-way group will ramp their light value in an up direction and a down direction in a synchronous manner. A light relay device in the same multi-way group will also ramp up and down, but since it only has two levels, on and off, a ramp up turns it on and a ramp down turns it off. The herein-described actual embodiment of the invention employs the same load control button interface for local load control and multi-way group control when in the normal mode of operation.

During manual programming of a multi-way group using the load control buttons of a device to set up and assign multi-way group membership, a design concept known as the "current multi-way" influences the process. The current multi-way is a temporary set of elected and incumbent multi-way group member loads for the multi-way group being programmed during the current multi-way programming session. Load membership election is attained by toggling the load button of the desired home automation and control system devices when the system devices are in multi-way programming mode. Presses on the same load button continue to toggle the device load between including the load and removing the load from membership in the current multi-way being programmed in this session until the multi-way is captured and the current session is ended. Devices in multi-way programming mode that receive a command to copy a previously captured multi-way group and whose loads are members of the copied multi-way group, attain incumbent membership in the current multi-way group.

Figure 13:
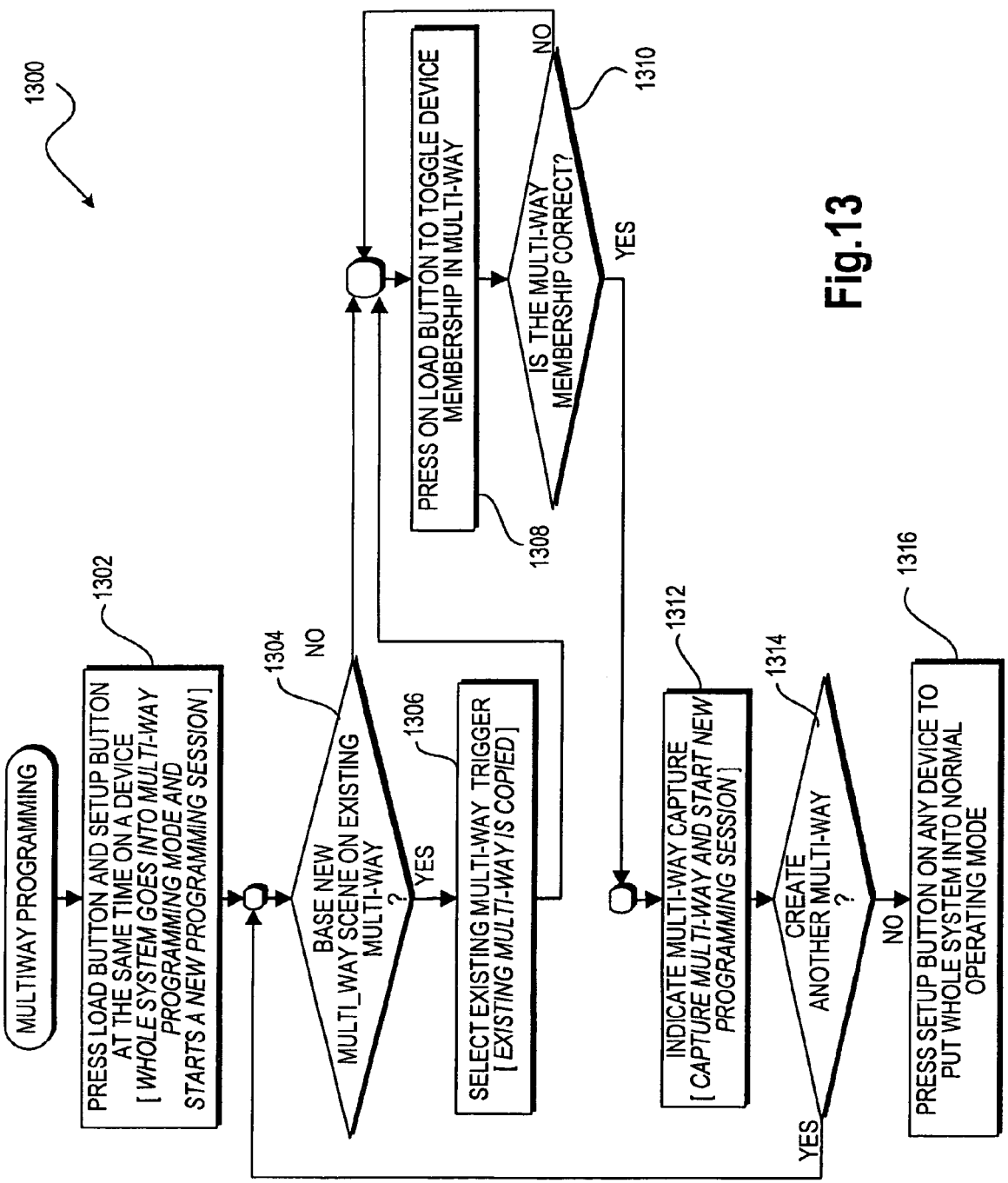
FIG. 13 is a flow diagram showing an illustrative routine for programming multi-way groups in a home automation and control system according to an actual embodiment of the present invention.

FIG. 13 is a flow diagram 1300 showing how multi-way groups are programmed using an SPI formed in accordance with this invention. As will be better understood from the following description, the flow diagram combines user actions and device actions. To understand how the SPI functions during multi-way group programming, it is important to remember that at least one button of a device is dedicated to local load control. In multi-way group programming the load control button is used to select or remove a device as a member of the multi-way group. The flow diagram 1300 for programming a multi-way group shown in FIG. 13 is similar to the flow diagram 900 for scene programming shown in FIG. 9 and described above. However, some of the implementation details are different. One difference is that each multi-way group member load control button is automatically a multi-way controller, so there is no need to identify a trigger button when capturing the multi-way group. In the embodiment of the invention herein described multi-way capture is created by pressing a multi-way group member load button for a predetermined period of time, e.g., three seconds, instead of selecting a trigger button. Multi-way capture results in all load buttons of the multi-way group controlling the multi-way group. During multi-way programming, load adjustments are binary toggle. Load buttons do not control device loads during a multi-way programming session. The first load button press includes the device as a member. The next load button press excludes the device load from membership in the current multi-way being programmed in the session. Thus, multi-way programming differs from house scene programming in that the load control is disabled during multi-way programming. The load value does not change when the load control button of a device is pressed to toggle the device load between membership and non-membership in the current multi-way group being programmed in the current multi-way programming session.

Routine 1300 begins at block 1302 where a user provides a manual indication to one device in the system to initiate multi-way programming, such as pressing the setup button and the load button at the same time. The manual indication causes the whole system to be put into the multi-way programming mode of operation and start a new multi-way programming session. Once the system is in the multi-way programming mode of operation, the routine 1300 proceeds to block 1304 where the user determines if the purpose of the current multi-way programming session is to create a new multi-way based on an existing multi-way, or if the purpose of the current multi-way programming session is to create a new multi-way that is not based on an existing multi-way. If the user determines that the purpose of the current programming session is to create a new multi-way based on an existing multi-way, the routine 1300 proceeds to block 1306 where the load button of the existing multi-way group is selected as the first action in the multi-way programming session and the existing multi-way membership is copied to the current multi-way being programmed. Once the existing multi-way membership is copied, the routine 1300 proceeds to block 1308 where the current multi-way group membership is modified by adding or removing group members. As noted above, pressing the load control button of a device toggles the multi-way membership of that device. If the device is a member of the current multi-way group being programmed, pressing the load button removes it as a current multi-way member. If the device is not a member of the current multi-way group, pressing the load button selects it as a member. Once the device multi-way membership is toggled, the routine 1300 proceeds to block 1310 where a test is made to determine if the total current multi-way group membership is correct. If the current multi-way membership is not correct, the routine 1300 branches back to block 1308. In essence, this feedback loop represents user selection input. When the current multi-way group membership is correct, the routine 1300 branches to block 1312. In block 1312 the program responds to an indication to capture the multi-way group, such as a press and hold for six seconds on the load button of a multi-way member. This indication initiates the capture of the current multi-way group, completes the current multi-way group programming session, and starts a new multi-way group programming session. From block 1312 the flow proceeds to block 1314 where a user determines if there is another multi-way to be programmed. Block 1314 returns to block 1304 if there is another multi-way group to be programmed. If no more multi-way groups are to be programmed, the flow proceeds to block 1316 where a manual indication is provided by the user to one device to return the system to the normal operating mode 506, such as pressing the device's setup button. Those skilled in the art will understand that SPI could be implemented such that a device scene trigger button could also be programmed to act as a multi-way controller, although the scene trigger button has no local load control and its only multi-way function would be to act as a multi-way command input.

Figure 14:
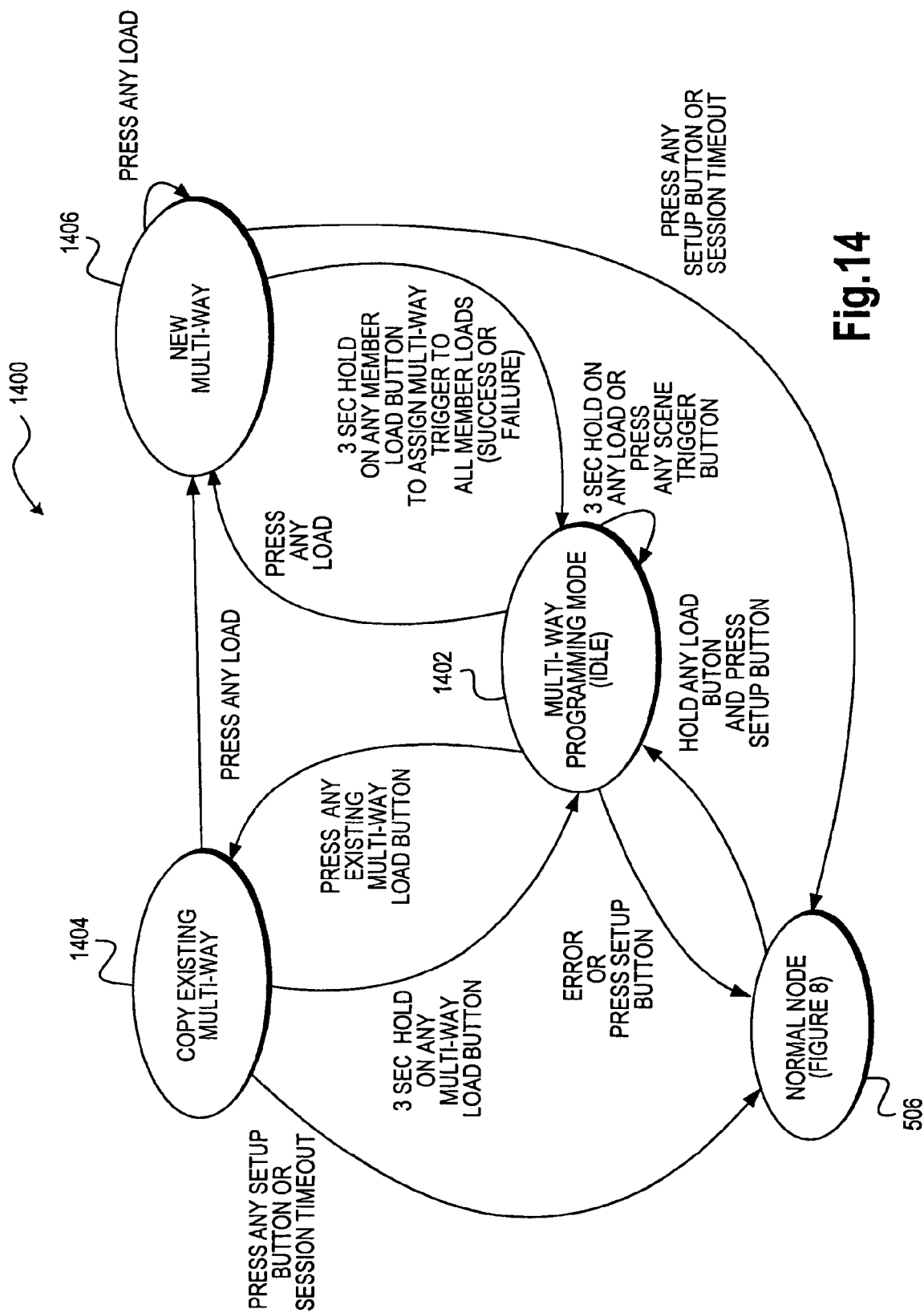
FIG. 14 is a state diagram showing an illustrative state machine for programming a multi-way group according to an actual embodiment of the present invention.

Referring now to FIG. 14, an illustrative state machine 1400 will be described for programming a multi-way group according to an actual embodiment of the present invention. The state machine 1400 for programming a multi-way group illustrated in FIG. 14 is similar to the state machine 1000 for house scene programming illustrated in FIG. 10 and described above. However, some of the implementation details are different. One difference is that a multi-way identifier is used instead of a scene identifier.

The state diagram 1400 for providing multi-way programming begins operation in the normal mode (idle) state 506 illustrated more fully in FIG. 8 and described above. The state machine 1400 transitions to the multi-way programming mode (idle) state 1402 in response to an indication that the multi-way programming mode is to be entered, such as by a user holding the load button while pressing a single press on the setup button (located behind the cover plate of a switch). The device receiving the indication places all system devices in multi-way group programming mode by broadcasting a multi-way programming mode notification message. Upon entering the multi-way programming idle state 1402, each device causes an indicator LED on the device to indicate that the device is in multi-way programming mode, such as by causing the LED to slowly flash red.

If the load button is toggled (pressed) on any device, the state machine 1400 moves from the multi-way programming mode (idle) state 1402 to a new multi-way state 1406 and a notification of multi-way adjustment message is broadcast by the device. As described above with respect to FIG. 13, when in the new multi-way state 1406, additional members may be added to or removed from membership in the current multi-way group by toggling their load switch. When all current multi-way members have been selected, the current multi-way is captured by providing an indication such as holding any one of the multi-way load buttons for a preset period of time (e.g., three seconds). Once the multi-way is captured, an action on a load button of any one of the multi-way group devices causes all the multi-way group members to respond in the same manner as if the action occurred to the local load button, as described above with respect to FIG. 8. If desired, the multi-way programming mode may be implemented such that holding a non-member load button for the preset period of time (e.g., three seconds) makes that load a current multi-way member and captures the current multi-way at the same time. The device receiving the indication to capture the multi-way broadcasts a notification of multi-way capture message. After the multi-way is captured, the state machine 1400 returns to the multi-way programming mode(idle) state 1402. Another multi-way can now be programmed.

In order to base a new multi-way group on an existing multi-way group, the load button of one of the devices that are members of the existing multi-way must be pressed as the first action in a new multi-way programming session. This action causes the device to broadcast a notification of multi-way copy message that, in turn, will cause the state machine to transition from the multi-way programming mode (idle) state 1402 to an copy existing multi-way state 1404. The members of the copied (existing) multi-way group will remain as incumbent members of the "current multi-way" group being programmed in the current multi-way programming session unless removed before the current multi-way is captured. Adding a new current multi-way group member or removing a current multi-way member modifies the current multi-way and causes the state machine 1400 to transition to the new multi-way state 1406. The device whose load button is toggled to modify the current multi-way initiates the system device transition to the new multi-way state 1406 by broadcasting a multi-way adjustment notification message. In the new multi-way state 1406 the current multi-way group being programmed may be modified as many times as desired by pressing the load button to toggle the current multi-way membership. A device whose load button is used to toggled the device load membership in the current multi-way broadcasts a multi-way adjustment notification message. After the existing multi-way group is copied, and all current multi-way membership modification are complete, the current multi-way group may be captured using the multi-way capture procedure (three-second hold) that causes the current multi-way group being programmed in the current programming session to be captured. Capturing the new multi-way group also causes the state machine 1400 to transition from the new multi-way state 1406 back to the multi-way programming mode (idle) state 1402. The old copied multi-way group still exists but only for those copied multi-way members that were toggled out of the new multi-way group. If all of the old copied multi-way group members remain as incumbent members of the new scene, the old copied multi-way no longer exists. The device receiving the indication to capture the multi-way broadcasts a notification of multi-way capture message. After the multi-way is captured, the state machine 1400 returns to the multi-way programming mode (idle) state 1402. Another multi-way can now be programmed.

If a device in copy existing multi-way state 1404 is used to capture the current multi-way using the multi-way capture procedure (three-second hold), no modification has been made to the copied multi-way group membership, so the current multi-way being programmed is canceled. The device in copy existing multi-way state 1404 receiving the indication to capture the multi-way broadcasts a notification of current multi-way cancellation message. After the multi-way is cancelled, the state machine 1400 returns to the multi-way programming mode (idle) state 1402. Another multi-way can now be programmed.

A device may be given an indication to end multi-way programming mode by pressing the setup button of the device when the state machine 1400 is in the multi-way programming mode (idle) state 1402, the copy existing multi-way state 1404, or the new current multi-way state 1406. The device receiving the indication to end multi-way programming mode broadcasts an end of multi-way programming mode notification message. After the multi-way programming mode is ended, the state machine 1400 transitions back to the normal mode 506.

Figure 15:
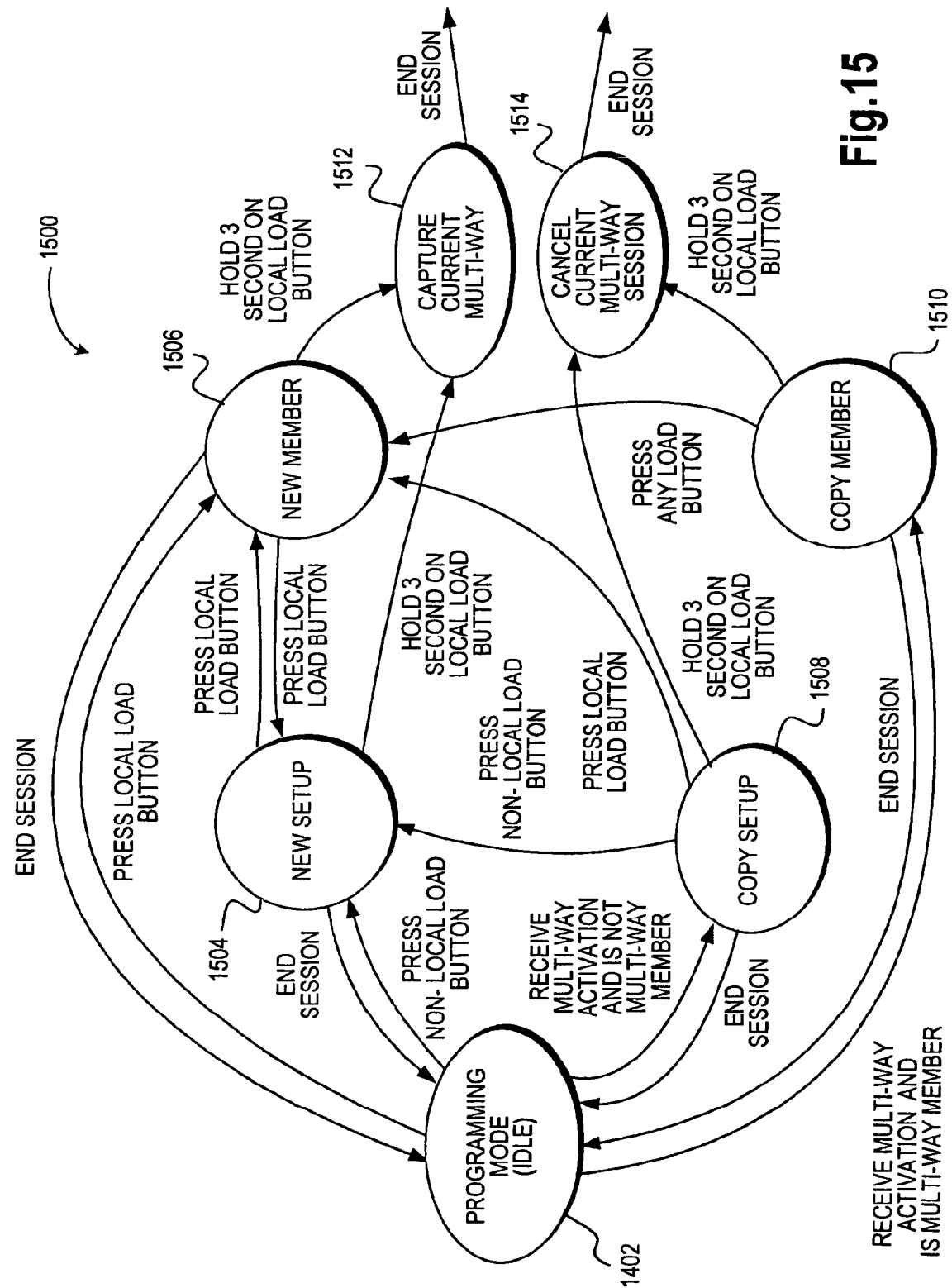
FIG. 15 is a state diagram showing an illustrative state machine for multi-way group copy and new multi-way group sub-states according to an actual embodiment of the present invention.

Those skilled in the art will appreciate that the activities performed during the multi-way programming capture of any multi-way group is dependent on the protocol used to implement the SPI, and the method used to group devices into a multi-way group. If the implementation employs a system-wide generic multi-way resource, there is no limit to the type of devices that can be included in a multi-way group. If multi-way group is implemented using an existing grouping method provided by the protocol used, those skilled in the art will appreciate that the resulting multi-way group implementation may be constrained by any limitations placed on the existing grouping method of the protocol employed by the implementation. The actual embodiment of the invention herein described employs the HPnP 82 resource channel group method with the lighting context. This implementation method requires that all devices that participate in the multi-way groups must have a lighting context. The multi-way identifier is then the HPnP 82 lighting context channel number. Acquisition of a multi-way identifier is implemented as the standard HPnP 82 channel resource hailing as described in the Home Plug and Play Specification. Since details of the HPnP 82 lighting context, channel number and channel resource hailing can be found in the *Home Plug and Play Specification* and the *CEBus Specification*, they are not further detailed herein. FIG. 15 illustrates a state machine 1500 that shows additional details of the new multi-way and copy existing multi-way states illustrated in FIG. 14 and described above. Thus, the state machine 1500 shows additional aspects of the new multi-way, and copy existing multi-way functions described above with respect to FIG. 14. Particularly, the new multi-way state 1406, shown in FIG. 14, is shown as two separate sub-states, a new setup sub-state 1504, and a new member sub-state 1506. The sub-state that a device in the new multi-way state 1406 is in will depend on whether the device is or is not included as a current multi-way group member. If a device in the new multi-way state 1406 is not a member of the current multi-way group being programmed, it will be in the new setup sub-state 1504. If a device in new multi-way state 1406 is a member of the current multi-way being programmed, it will be in the new member sub-state 1506. Similarly, the copy existing multi-way state 1408, also shown in FIG. 14, is shown as two separate sub-states, a copy setup sub-state 1508 and a copy member sub-state 1510. The sub-state that a device in the copy existing state 1408 is in will depend on whether the device is or is not included as a current multi-way group member. If a device in copy existing state 1408 is not a member of the current multi-way group being programmed, it will be in the copy setup sub-state 1508. If a device in copy existing multi-way group state 1408 is a member of the current multi-way being programmed, it will be in the copy member sub-state 1510. A device in the new member sub-state 1506 or the copy member sub-state causes an indicator LED on the device to indicate that the device is a member of the current multi-way being programmed, such as by causing the LED to be solid red. A device in the programming idle state 1402 or the new setup sub-state 1506 or the copy setup sub-state causes an indicator LED on the device to indicate that the device is not a member of the current multi-way being programmed, such as by causing the LED to be slow flashing red. These sub-states are described below.

A device in the multi-way programming (idle) mode 1402 will broadcast a notification of multi-way adjustment message when the device receives a local indication to include it in the current multi-way group. A device in the multi-way programming (idle) mode 1402 will also broadcast a notification of multi-way adjustment message when the device receives a local indication to remove itself as a member of the current multi-way group. As noted above, a press on the local load button toggles a device between membership and non-membership. A press on the load button of a current multi-way non-member will indicate the device is to be included as a member. A press on the load button of a current multi-way member will indicate the device is to be removed as a member of the current multi-way group being programmed. A device enters the new member sub-state 1506 when the device load becomes a member of the current multi-way group by its load button being pressed while the system is in the multi-way programming mode (idle) state 1402. A device also enters the new member sub-state 1506 when the device load becomes a member of the current multi-way group by its load button being pressed while the device is in the new setup sub-state 1504. A device also enters the new member sub-state 1506 from the copy member sub-state 1510 when the device load is an incumbent member of the current multi-way group and the device receives notification of multi-way adjustment because another device has been elected as a member.

A device enters the new setup sub-state 1504 from the copy setup sub-state 1508 if the device load is not an incumbent member of the current multi-way group but receives notification of multi-way adjustment because another device has been elected as a member. Such a device transitions to the new member sub-state 1506 if the device's load button is pressed. If a device's load button is pressed in the new member sub-state 2506 to remove its membership, the state machine 1500 transitions from the new member sub-state 1506 to the new setup sub-state 1504.

A device enters the copy setup sub-state 1508 if a multi-way copy message is received while the device is in the multi-way programming (idle) state 1402 and the device is not a member of the copied multi-way group. If a notification message indicating that the multi-way group has been adjusted (by a press on any non-local load button) is received while a device is in the copy setup sub-state 1508, the state machine 1500 will transition from state 1508 to the new setup sub-state 1504. If a device's load button is pressed while the device is in the copy setup sub-state 1508, that device's state machine 1500 transitions to the new member sub-state 1506.

A device enters the copy member sub-state 1510 if a multi-way copy activation message is received while the device is in the multi-way programming (idle) state 1402 and the device is a member of the copied multi-way group. From the copy member sub-state 1510, the state machine 1500 transitions to the new setup sub-state 1504 if the device's load button is pressed to remove the device load from membership in the current multi-way group being programmed. From the copy member sub-state 1510, the state machine 1500 transitions to the new member sub-state 1506 if a notification message is received that indicates a multi-way adjustment by another device has occurred. As previously noted, such a message is generated when the load button of the other device is pressed.

Once all multi-way members have been included in the group, the multi-way group is captured when an indication, such as pressing the load button of a current multi-way member for three seconds, for example, occurs. The device receiving the indication broadcasts a multi-way capture message to the system devices. If a multi-way capture message is received while a device is in the copy setup sub-state 1508 or in the copy member sub-state 1510, no membership change is made to the copied multi-way group and the state machine 1500 transitions to the multi-way programming mode (idle) state 1402. If a multi-way capture message is received while a device is in the new member sub-state 1506, the device becomes an elected member of the currently captured multi-way group and then transitions to the multi-way programming mode (idle) state 1402. If a multi-way capture message is received while a device is in the new setup sub-state 1504, the device load is not a member of the multi-way currently being captured and the device transitions to the multi-way programming mode (idle) state 1402. For embodiments of the invention that employ the HPnP lighting context channel method, the multi-way identifier channel number is stored and configured in the local multi-way lighting context during multi-way capture by member devices.

If a device is given an indication, such as the device load button is pressed for a predetermined period of time, e.g., three seconds, to capture the current multi-way group while the device is in the new setup sub-state 1504 or new member sub-state 1506, the device transitions to the capture current multi-way sub-state 1512. When a device is in the capture current multi-way sub-state 1512, a unique multi-way identifier is acquired and a multi-way capture message is broadcast. As previously discussed, a device receiving a multi-way capture message that is a member of the current multi-way being programmed responds according to the multi-way creation and launch method used. After the multi-way group is captured (sub-state 1512), the state machine 1500 transitions to the multi-way programming mode (idle) state 1402.

If a member device load button is pressed for the prescribed period of time, e.g., three seconds, to capture the current multi-way group while the device is in the copy member sub-state 1510 or copy member sub-state, no change is made to the copied multi-way group. The device transitions to the cancel current multi-way sub-state 1514 and a cancel current multi-way message is broadcast. The state machine 1500 then transitions to the multi-way programming mode (idle) state 1402.

Figure 16:
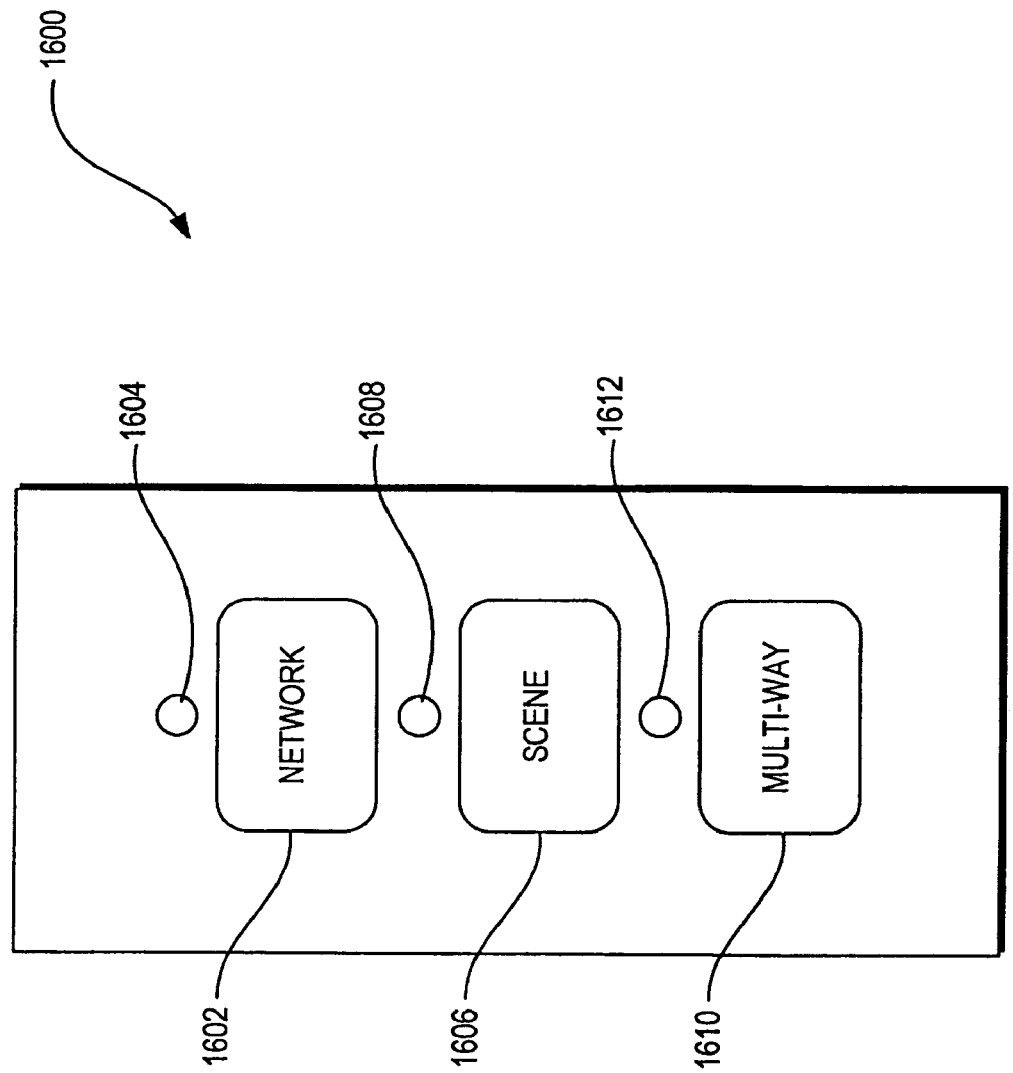
FIG. 16 is a diagram showing an illustrative expanded setup interface in accordance with an alternative embodiment of the present invention.

The state machine 1500 also transitions to the multi-way programming mode (idle) state 1402 from the copy member sub-state 1510, the copy setup sub-state 1508, the new member sub-state 1506, and the new setup sub-state 1504 if no session activity happens for more than a preset amount of time since the last session activity. FIG. 16 illustrates an expanded setup interface 1600. This interface is an alternative to the single setup button 42 and the non-load feedback use of the single tri-state LED 74 discussed above. As described above, the switch device shown in FIGS. 3A–3C includes a single setup button 42 for controlling multiple programming modes, and a single tri-state LED 74 for indicating multiple status states. The compactness of the single setup button and status LED can be advantageous for small switch devices. However, to differentiate the initiation of the multiple modes requires different button press sequences or timing, together with different colors or flashing feedback sequences from the status LED, which may be difficult to interface with for inexperienced or infrequent users. Accordingly, the expanded setup interface 1600 is provided for use on those devices wherein space is not a premium. A home automation and control system formed in accordance with this invention can incorporate either the expanded interface 1600 or a single setup button 42, or both.

The expanded setup interface spreads the setup button device system mode initiation functionality to three separate buttons. The expanded setup interface separates and spreads the system mode feedback to three separate LEDs, with each LED supplying feedback only for one configuration or programming mode. The expanded setup interface includes a network button 1602, and corresponding network status LED 1604, for use in configuring a home automation and control system device. The expanded setup interface also includes a scene button 1606, and corresponding scene status LED 1608, for use in entering and exiting scene programming mode. The expanded setup interface further includes a multi-way button 1610, and corresponding multi-way status LED 1612, for use in entering and exiting a multi-way group programming mode. The preferred embodiment is to have all switches and other size constrained devices in the network use the single setup button interface that has been slightly modified to function with other system devices having the expanded setup interface.

Figure 17:
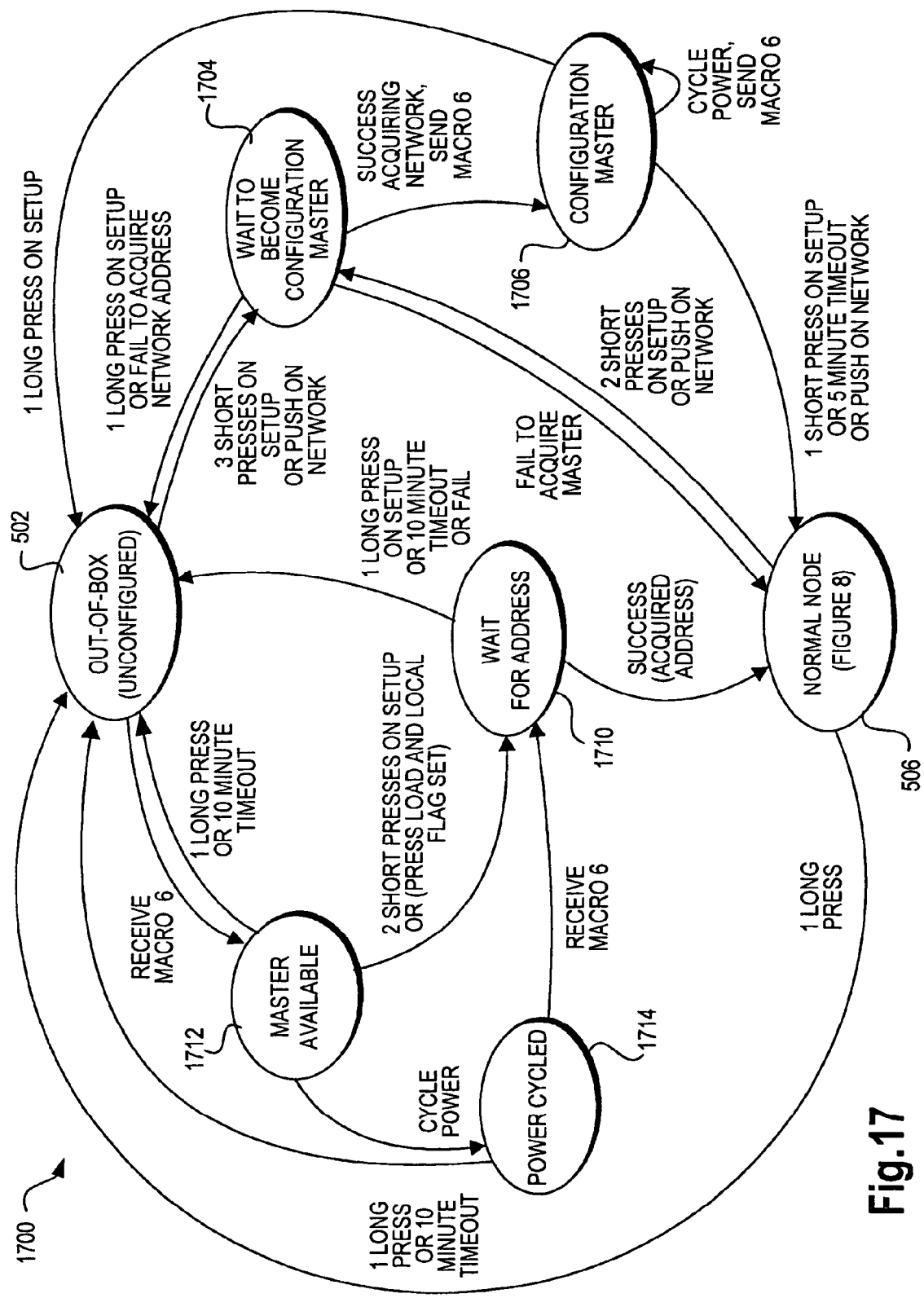
FIG. 17 is a state diagram showing an illustrative state machine for configuring a home automation and control system device according to an alternative embodiment of the present invention.

FIG. 17 illustrates a state machine 1700 for configuring a home automation and control system device having either a single setup button 42 interface or an expanded setup interface 1600. The state machine 1700 and associated states 1704 through 1714 correspond with the state machine 700 and states 704 through 714, respectively, described above in connection with FIG. 7. In addition, the state machine 1700 shown in FIG. 17 also provides for state transitions when the user depresses the network button 1602. In particular, pressing the network button 1602 on an unconfigured device will cause the state machine 1700 to change state from an out-of-box (unconfigured) state 502 to the wait to become master state 1704, i.e., the state where the device attempts to become the configuration master, in the same manner as pressing three times on the setup button. In an already configured device, pressing the network button causes the state machine, which is in the normal mode state 506 to transition to the wait to become master state 1704, in the same manner as pressing two times on the setup button. When in the wait to become master state 1704, the network LED 1604 provides a feedback indication to the user that the device is attempting to become master, such as by turning solidly on. Once the device becomes a configuration master, the device transitions to the configuration master state 1706, and provides a feedback indication to the user that the device is now the master, such as by the network LED 1604 flashing on and off. Pressing the network button while the device is in the configuration master state 1706 causes the state machine to transition to the normal mode state 506, in the same manner as pressing one time on the setup button. The transition to the normal mode state 506 causes the network LED 1604 to provide a feedback indication to the user that the device is no longer master, such as by going off.

When the device becomes the configuration master, the device in addition to sending the macro 6 command to all other devices in the network indicating that a configuration master is active in the network, also sends a command that enables a simpler manual state transition indication option, which sets a local flag. This flag will be set in both single setup button interface devices and devices using the alternative setup interface. Receiving the macro 6 command causes all of the unconfigured devices in the network to move from state 502 to the master available state 1712. Unconfigured devices in state 1712 with the local flag set respond to a simpler manual input to transition to the wait for address state 1710. This simpler input in both single setup button interface devices and devices using the alternative setup interface is a press on the load button. This manual input is simpler from the user's view than a press on the setup button, since the setup button may be obscured by a faceplate that takes time to remove, such as on a wall switch face plate.

Figure 18:
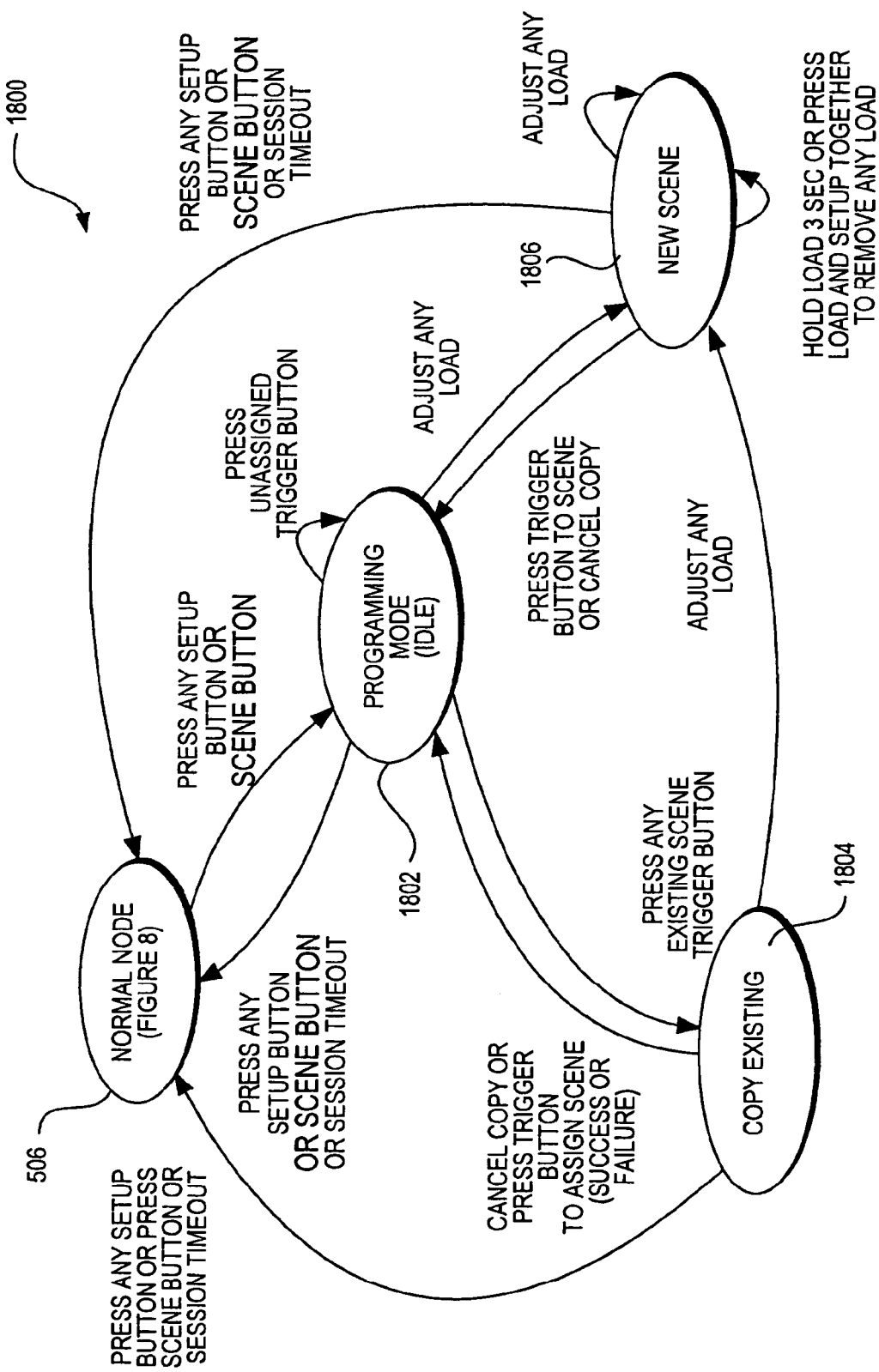
FIG. 18 is a state diagram showing an illustrative state machine for providing a programming interface in an alternative embodiment of the present invention.

FIG. 18 illustrates a state machine 1800 for implementing the house scene programming mode using either a single setup button 42 interface or an expanded setup interface 1600. The state machine 1800 and associated states 1802, 1804, and 1806 correspond with the state machine 1000 and states 1004, 1008, and 1006, respectively, described above in connection with FIG. 10. In addition, the state machine 1800 shown in FIG. 18 also provides for state transitions when the user depresses the scene button 1606. In particular, pressing the scene button 1606 causes the state machine, which is in the normal mode state 506, to change to programming mode (idle) state 1802 the scene LED 1608 to provide a feedback indication to the user that the device is in the scene programming mode, such as by flashing on and off. Pressing the scene button 1606 when a device is in the programming mode (idle) state 1802, new scene state 1806, or the copy existing state 1804 causes the state machine to return to the normal mode state 506, and the scene LED 1608 to provide a feedback indication to the user that the device is no longer in the scene programming mode, such as by turning off.

Figure 19:
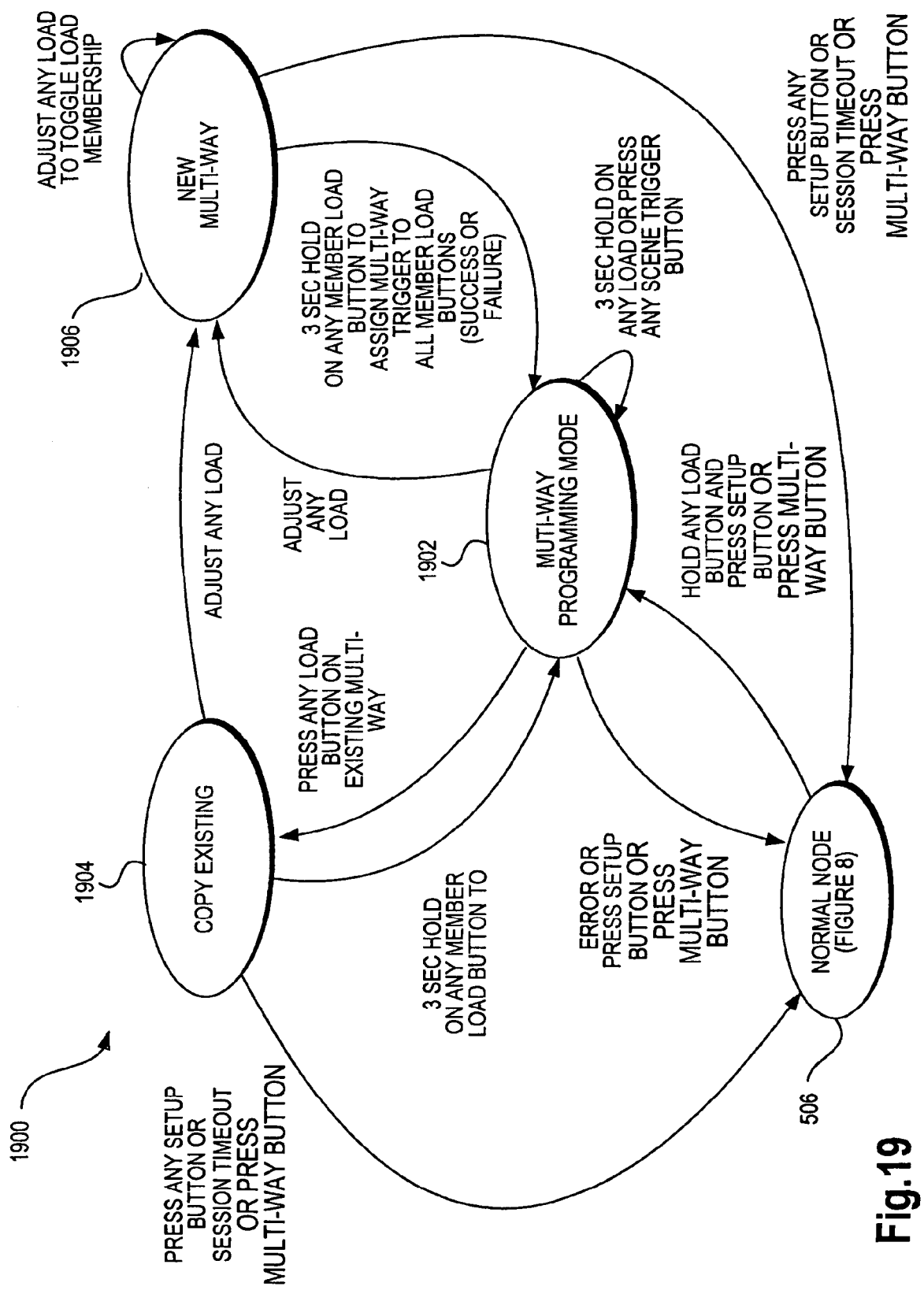
FIG. 19 is a state diagram showing an illustrative state machine for programming a multi-way according to an alternative embodiment of the present invention.

FIG. 19 illustrates a state machine 1900 for programming a multi-way using either a single setup button 42 interface or an expanded setup interface 1600. The state machine 1900 and associated states 1902, 1904, and 1906 correspond with the state machine 1400 and states 1402, 1404, and 1406, respectively, described above in connection with FIG. 14. In addition, the state machine 1900 shown in FIG. 19 also provides for state transitions when the user depresses the multi-way button 1610. In particular, pressing the multi-way button 1610 causes the state machine, which is in the normal mode 506, to change to a multi-way programming mode (idle) state 1902 and the multi-way LED 1612 to provide a feedback indication to the user that the device is in the multi-way programming mode, such as by flashing on and off. When a device is in the multi-way programming mode (idle) state 1902, the new multi-way state 1906, or the copy existing multi-way state 1904, pressing the multi-way button causes the state machine to return to the normal mode 506 and the multi-way LED 1612 to provide a feedback indication to the user that the device is no longer in the multi-way programming mode, such as by turning off.

In light of the foregoing description, it will be appreciated that the present invention provides a method, system, and apparatus for providing distributed control and programming of a home automation and control system. While illustrative embodiments of the invention have been illustrated and described, it will be appreciated that various changes can be made therein without departing from the spirit and scope of the invention defined by the appended claims.

While illustrative embodiments have been illustrated and described, it will be appreciated that various changes can be made therein without departing from the spirit and scope of the invention.

The embodiments of the invention in which an exclusive property or privilege is claimed are defined as follows:

1. A programmable device suitable for directly controlling the operational status of a product or appliance, the programmable device including a simplified programming interface, the programmable device suitable for inclusion in a scene creating automation and control system comprising a plurality of similar programmable devices, each suitable for directly controlling the operational status of a product or appliance, said programmable device comprising:
   (a) a plurality of manually actuatable input elements; and
   (b) a controller for directly controlling the operational status of a product or appliance, said controller including a memory for storing a plurality of modes of operation entered by at least one of the selective actuation of said plurality of manually actuatable input elements and the receipt of messages from other similar programmable devices generated in response to the selective actuation of the plurality of manually actuatable input elements of said other similar programmable devices, said plurality of modes of operation including:
   (i) a programming mode for controlling the storage of the operational status of said product or appliance controlled by said programmable device; and
   (ii) a normal mode for retrieving the stored operational status of the product or appliance directly controlled by said programmable device in response to the receipt of a scene launch command and adjusting the operational status of said product or appliance in accordance with said stored operational status.

2. A programmable device suitable for directly controlling the operational status of a product or appliance as claimed in claim 1 wherein said programming mode includes a plurality of states that are entered in response to the selective actuation of said plurality of manually actuatable input elements.

3. A programmable device suitable for directly controlling the operational status of a product or appliance as claimed in claim 1 wherein said normal mode includes a plurality of states entered by the at least one of the selective actuation of said plurality of manually actuatable input elements and the receipt of messages generated by other similar programmable devices in response to the selective actuation of the plurality of manually actuatable input elements of said other similar programmable devices.

4. A programmable device including a suitable for directly controlling the operational status of a product or appliance as claimed in claim 1 wherein said plurality of modes of operation also include a multi-way programming mode for controlling the operation of said programmable device in concert with the operation of other similar programmable devices.

5. A programmable device including a suitable for directly controlling the operational status of a product or appliance as claimed in claim 4 wherein said multi-way programming mode includes a plurality of states entered by the at least one of the selective actuation of said plurality of manually actuatable input elements and the receipt of messages generated by other similar programmable devices in response to the selective actuation of the plurality of manually actuatable input elements of said other similar programmable devices.

6. A programmable device including a suitable for directly controlling the operational status of a product or appliance as claimed in claim 1 wherein said plurality of modes of operation also include a configuration mode for configuring said programmable device.

7. A programmable device including a suitable for directly controlling the operational status of a product or appliance as claimed in claim 6 wherein said configuration mode includes a plurality of states, said states being entered into by the at least one of the selective actuation of said plurality of manually actuatable input elements and the receipt of messages generated by other similar programmable devices in response to the selective actuation of the plurality of manually actuatable input elements of said other similar programmable devices.

8. A simplified method for programming a programmable device suitable for controlling the operation of a product or appliance included in an automation and control system comprising a plurality of similar programmable devices, each suitable for directly controlling the operation of a product or appliance to create scenes, each of said programmable devices including a plurality of manually actuatable input elements, said method comprising:

in response to the at least one of the selective actuation of said plurality of manually actuatable input elements and the receipt of messages from other similar programmable devices generated in response to the selective actuation of said plurality of manually actuatable input elements of said other similar programmable devices placing said programmable device in one of a plurality of modes of operation, said plurality of modes of operation including:

(a) a programming mode for controlling the storage of the operational status of said product or appliance directly controlled by said programmable device; and (b) a normal mode for retrieving the stored operation status of the product or appliance directly controlled by said programmable device in response to the receipt of a scene launch command and adjusting the operational status of said product or appliance in accordance with said stored operational status.

9. A simplified method for programming a programmable device suitable for controlling the operation of a product or appliance included in an automation and control system comprising programmable devices for directly controlling the operation of a product or appliance to create scenes as claimed in claim 8 wherein said programming mode includes a plurality of states, and said method including placing said programmable device in one of said states in response to the at least one of the selective actuation of said plurality of manually actuatable input elements and the receipt of messages generated by other similar programmable devices in response to selective actuation of said plurality of manually actuatable input elements of said other similar programmable devices.

10. A simplified method for programming a programmable device suitable for controlling the operation of a product or appliance included in an automation and control comprising programmable devices for directly controlling the operation of a product or appliance to create scenes as claimed in claim 8 wherein said normal mode includes a plurality of states, and said method includes placing said programmable device in one of said states in response to the at least one of the selective actuation of said plurality of manually actuatable input elements and the receipt of messages generated by other similar programmable devices in response to the selective actuation of said plurality of manually actuatable input elements of said other similar programmable device.

11. A simplified method for programming a programmable device suitable for controlling the operation of a product or appliance included in an automation and control comprising programmable devices for directly controlling the operation of a product or appliance to create scenes as claimed in claim 10 wherein said states of said normal mode include:

an idle state that is entered when said programmable device enters said normal mode; and a control load state that is entered in response to the selective actuation of said plurality of manually actuatable input elements.

12. A simplified method for programming a programmable device suitable for controlling the operation of a product or appliance included in an automation and control system comprising programmable devices for directly controlling the operation of a product or appliance to create scenes as claimed in claim 8 wherein said plurality of modes of operation also include a multi-way programming mode of operation.

13. A simplified method for programming a programmable device suitable for controlling the operation of a product or appliance included in an automation and control comprising programmable devices for directly controlling the operation of a product or appliance to create scenes as claimed in claim 12 wherein said multi-way programming mode includes a plurality of states, said plurality of states entered by said programmable device in response to the at least one of the selective actuation of said plurality of manually actuatable input elements and the receipt of messages generated by other similar programmable devices in response to the selective actuation of said plurality of manually actuatable input elements of said other similar programmable devices.

14. A simplified method for programming a programmable device suitable for controlling the operation of a product or appliance included in an automation and control comprising programmable devices for directly controlling the operation of a product or appliance to create scenes as claimed in claim 8 wherein said plurality of modes of operation also include a configuration mode for configuring said programmable device.

15. A simplified method for programming a programmable device suitable for controlling the operation of a product or appliance included in an automation and control system comprising programmable devices for directly controlling the operation of a production appliance to create scenes as claimed in claim 14 wherein said configuration mode includes a plurality of states, and said method includes placing said programmable device in one of said states in response to the at least one of the selective actuation of said plurality of manually actuatable input elements and the receipt of messages generated by other similar programmable devices in response to the selective operation of the plurality of manually actuatable input elements of said other similar programmable devices.

* * * * *